(12) United States Patent
DeMeritt et al.

(10) Patent No.: US 10,698,167 B2
(45) Date of Patent: Jun. 30, 2020

(54) CONNECTOR DEVICE FOR CONNECTING AT LEAST ONE OPTICAL FIBER END PIECE AND MANUFACTURING METHOD

(71) Applicant: CORNING OPTICAL COMMUNICATIONS LLC, Hickory, NC (US)

(72) Inventors: Jeffery Alan DeMeritt, Painted Post, NY (US); Wojciech Piotr Giziewicz, Berlin (DE); Christopher Paul Lewallen, Hudson, NC (US); James Phillip Luther, Hickory, NC (US); Jerald Lee Overcash, China Grove, NC (US); Rebecca Kayla Schaevitz, Sunnyvale, CA (US)

(73) Assignee: Corning Optical Communcations LLC, Charlotte, NC (US)

( * ) Notice: Subject to any disclaimer, the term of this patent is extended or adjusted under 35 U.S.C. 154(b) by 0 days.

(21) Appl. No.: 15/705,638

(22) Filed: Sep. 15, 2017

(65) Prior Publication Data
US 2018/0017744 A1     Jan. 18, 2018

Related U.S. Application Data

(63) Continuation of application No. PCT/US2016/020177, filed on Mar. 1, 2016.
(Continued)

(51) Int. Cl.
*G02B 6/42* (2006.01)

(52) U.S. Cl.
CPC ........ *G02B 6/4214* (2013.01); *G02B 6/423* (2013.01); *G02B 6/428* (2013.01); *G02B 6/4249* (2013.01);
(Continued)

(58) Field of Classification Search
CPC ...................................... G02B 6/42
(Continued)

(56) References Cited

U.S. PATENT DOCUMENTS 4,735,677 A * 4/1988 Kawachi ............ G02B 6/12004
216/24
7,063,467 B2 * 6/2006 Nagasaka ............ G02B 6/4214
385/88
(Continued)

FOREIGN PATENT DOCUMENTS

| EP | 2772779 A1 | 9/2014 |
| JP | 2010122312 A | 6/2010 |
| WO | 2013112171 A1 | 8/2013 |

OTHER PUBLICATIONS

International Search Report and Written Opinion of the International Searching Authority; PCT/US2016/020177; dated June 15, 2016; 14 Pages; European Patent Office.

*Primary Examiner* — Kaveh C Kianni
(74) *Attorney, Agent, or Firm* — Michael E. Carroll, Jr.

(57) ABSTRACT

A connector device for connecting optical fiber endpieces comprising an optoelectronic chip, a fiber end piece holder and a reflection surface. The chip is oriented for emitting and/or detecting optical signals along a first propagation direction normal to a circuit board. The reflection surface changes a propagation direction of optical signals from the first propagation direction to a different, second propagation direction and/or vice versa. The connector device comprises a layered optical stack mounted to the circuit board and designed for propagation of optical signals along the first propagation direction. The connector device further comprises a coupling adapter piece mounted to the layered optical stack that holds and/or secures the fiber end piece holder in an orientation enabling propagation of signals radiation along the second propagation direction. The reflec-
(Continued)

tion surface for changing between both propagation directions is comprised in the coupling adapter piece.

40 Claims, 21 Drawing Sheets

Related U.S. Application Data

(60) Provisional application No. 62/135,265, filed on Mar. 19, 2015.

(52) U.S. Cl.
CPC ......... *G02B 6/4257* (2013.01); *G02B 6/4259* (2013.01); *G02B 6/4292* (2013.01)

(58) Field of Classification Search
USPC .......................................................... 385/39
See application file for complete search history.

(56) References Cited

U.S. PATENT DOCUMENTS

| | | | | |
|---|---|---|---|---|
| 7,070,339 B2* | 7/2006 | Nagasaka | ............ | G02B 6/4204 385/53 |
| 7,118,293 B2* | 10/2006 | Nagasaka | ............ | G02B 6/4214 385/89 |
| 7,210,861 B2* | 5/2007 | Nagasaka | ............ | G02B 6/4214 385/88 |
| 8,432,625 B2 | 4/2013 | Duparre et al. | | |
| 2002/0018625 A1* | 2/2002 | Grann | ................ | G02B 6/29358 385/88 |
| 2002/0097962 A1* | 7/2002 | Yoshimura | ............... | G02B 6/10 385/50 |
| 2002/0196500 A1* | 12/2002 | Cohen | .................. | G02B 6/4214 398/139 |
| 2006/0008199 A1* | 1/2006 | Glebov | .................. | G02B 6/322 385/15 |
| 2006/0028935 A1* | 2/2006 | Mori | .................... | G11B 7/1275 369/44.37 |
| 2006/0153023 A1* | 7/2006 | Hikichi | ................ | G02B 5/1871 369/44.23 |
| 2006/0239605 A1* | 10/2006 | Palen | ................... | G02B 6/4206 385/14 |
| 2010/0171023 A1* | 7/2010 | Asahi | ................... | G02B 6/4201 250/205 |
| 2010/0247043 A1* | 9/2010 | Sugawara | ........... | G02B 6/4201 385/93 |
| 2011/0216998 A1 | 9/2011 | Symington et al. | | |
| 2013/0230280 A1* | 9/2013 | Kadar-Kallen | ...... | G02B 6/4204 385/33 |
| 2014/0037247 A1 | 2/2014 | Mathai et al. | | |
| 2014/0099059 A1 | 4/2014 | Pommer et al. | | |
| 2014/0105535 A1* | 4/2014 | Chan | .................... | G02B 6/4204 385/14 |
| 2014/0153866 A1* | 6/2014 | Lee | ......................... | G02B 6/43 385/14 |
| 2014/0153881 A1* | 6/2014 | Liff | ...................... | G02B 6/4214 385/89 |
| 2014/0341506 A1* | 11/2014 | Brenner | ................. | G02B 6/428 385/31 |
| 2015/0277066 A1* | 10/2015 | Nakagawa | ........... | G02B 3/0006 385/33 |
| 2017/0363821 A1* | 12/2017 | Giziewicz | .............. | G02B 6/428 |

* cited by examiner

CONNECTOR DEVICE FOR CONNECTING AT LEAST ONE OPTICAL FIBER END PIECE AND MANUFACTURING METHOD

PRIORITY APPLICATIONS

This application is a continuation of International Application No. PCT/US16/20177, filed on Mar. 1, 2016, which claims the befit of priority to U.S. Application No. 62/135,265, filed on Mar. 19, 2015, both applications being incorporated herein by reference.

BACKGROUND

The application refers to a connector device for connecting at least one optical fiber, especially for connecting endpieces of optical fibers of an active optical cable to an electric terminal. The application further refers to an active optical cable comprising at least one connector device and to a method of manufacturing a plurality of connector devices.

Electric terminals of computers and further technical devices, such as USB port terminals, for instance, are connectable by cables for the purpose of data transmission. There are electric cables as well as optical cables usable for data transmission between separate devices. In particular, there are active optical cables comprising active optoelectronic elements, such as laser diodes, VCSELs, photo detectors, or photo diodes, etc. serving for active electrical-optical signal conversion, or vice-versa. For instance, there are Thunderbolt™ cables based on an underlying electrical-optical data transmission protocol.

These and other kinds of active optical cables have to be connected to computers and other devices. For instance, there are USB-3 ports providing established standards for the geometry of the electric connector plugs at the ends of the active optical cables used, such as USB-C connectors, i.e. USB type-C connectors, which provide a standard for future cable port design.

There are further conventional plug designs such as the so-called 'display port' or the 'mini display port' which, however, represent passive optical cables for monitors, rather than active optical cables.

An active optical cable comprises a number of optical fibers, for instance four or eight optical fibers. For active optical cables, that is for cables actively converting electrical signals to optical signals or vice versa at the respective fiber end piece, there is the problem of how to effectively couple the optical fiber end piece to the active elements, such as laser diodes, VCSELs, photo detectors or photo diodes, etc. in order to ensure high coupling efficiency with minimum signal losses. Further, a mechanically robust design of the connector plugs of an optical fiber cable is needed. In particular, properly connecting both fiber end pieces to the light emitting and/or light detecting optoelectronic elements is still a critical issue since, for ensuring minimum signal losses, it is vital that each of the two fiber end pieces of any optical fiber is coupled to a corresponding optoelectronic element in an individually aligned position and/or orientation. Proper alignment of each fiber end piece to the photo diodes, laser diodes or other kinds of optoelectronic elements is challenging since, for reducing excessive connector plug height, an optical turn of about 90° is often required when the optoelectronic elements are mounted or arranged in an orientation chosen such that the propagation direction of radiation signals to be emitted and/or detected by them is substantially normal to the main surface of the circuit board of the respective connector device.

For achieving the optical turn by about 90° and for providing a robust electrical-optical connection with minimum signal loss, there is still a need for an adequate construction of connector devices and of active optical cables comprising them.

SUMMARY

The present application provides a connector device and an active optical cable comprising at least one connector device.

In particular, a connector device is disclosed for connecting at least one optical fiber endpiece. The connector device at least comprises a circuit board and an optoelectronic chip mounted on or above a main surface of the circuit board. The optoelectronic chip comprises at least one optoelectronic active element capable of emitting and/or detecting electromagnetic radiation (e.g., optical signals) transmissible via the at least one optical fiber. The optoelectronic chip is mounted in an orientation enabling propagation of radiation along a first propagation direction substantially normal to the main surface of the circuit board. The connector device may further comprise a fiber end piece holder which secures or is designed to secure at least one fiber end piece of at least one optical fiber in a position and/or orientation for enabling propagation of electromagnetic radiation along a second propagation direction. The second propagation direction is different from the first propagation direction and/or different from the normal direction of the main surface of the circuit board. The connector device comprises at least one reflection surface for changing a propagation direction of electromagnetic radiation between the first propagation direction and the second propagation direction.

According to the application, the connector device further comprises a layered optical stack comprising a number of layers. The layered optical stack is designed for optically transmitting signals of electromagnetic radiation, between the at least one optical fiber end piece and the optoelectronic chip, along the first propagation direction, i.e. substantially normal to the main surface of the circuit board.

Furthermore, the connector device comprises a coupling adapter piece for coupling the at least one fiber end piece or, alternatively, for coupling the fiber end piece holder, to a top surface of the layered optical stack. Furthermore, the at least one reflection surface is comprised in the coupling adapter piece and, for instance, may be a patterned surface portion thereof, such as a recessed surface portion of a top surface of the adapter piece.

The layered optical stack thus enables light propagation vertically, that is normal to the circuit board, whereas the coupling adapter piece mountable or mounted at the top surface of the layered optical stack comprises the reflection surface for changing the propagation direction between the first propagation direction substantially normal to the circuit board and the second propagation direction substantially predefined by the orientation of the fiber end pieces. The coupling adapter piece is designed to hold the fiber end piece holder in an orientation corresponding to the second propagation direction; i.e. substantially transverse to the normal direction of the circuit board.

Accordingly, a slim design of a connector device with a small vertical extension of the connector device in direction normal to the circuit board is obtained. Furthermore, as the layered optical stack, a diced or sawn-out piece of a low-cost, easily manufacturable multi-layer wafer or multi-layer substrate can be integrated in the connector device, thereby arriving at a very efficient constructional design and at reduced manufacturing efforts and costs, especially since mass production steps executable on a wafer scale basis, that is substrate level basis, can be used.

Furthermore, a method of manufacturing a plurality of connector devices is provided.

BRIEF DESCRIPTION OF THE DRAWINGS

Exemplary embodiments are discussed hereinbelow with reference to the figures.

DETAILED DESCRIPTION

Figure 1:
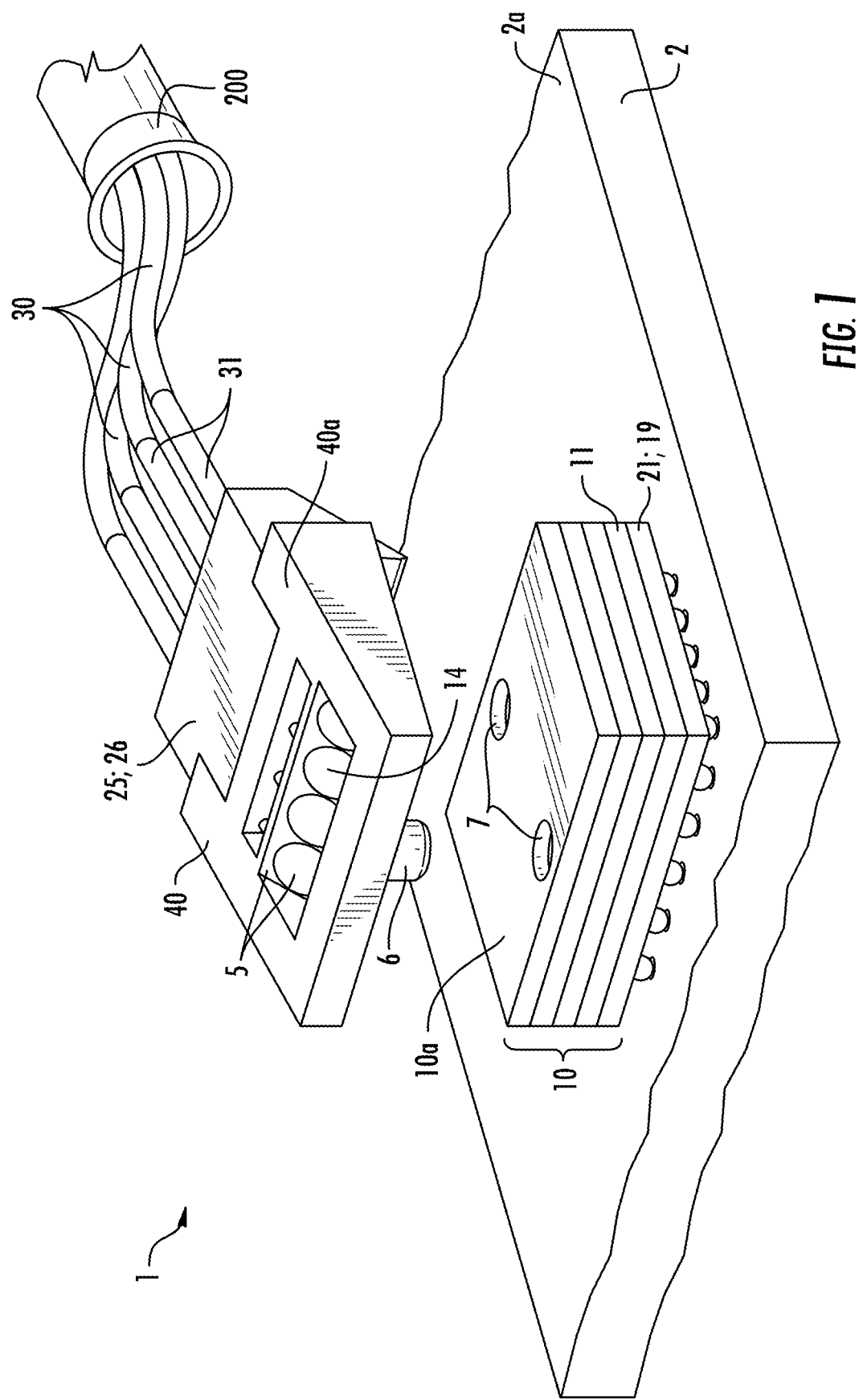
FIG. 1 shows a top perspective view of an embodiment of a connector device.

FIG. 1 shows a perspective view of an exemplary embodiment of a connector device 1 according to the present application. The connector device 1 may represent a standalone marketable product, or it may be provided at one or either end of at least one optical fiber so as to provide an active optical cable. The connector device 1 has a circuit board 2 which may comprise electronic circuitry 2b (FIG. 6) and may be mounted, at one end of the circuit board 2, to a connector plug, such as a USB-3 plug, particularly USB type-C plug, or a display port plug or mini display port plug. Thus, the connector device may comprise any kind of plug which is couplable to an electric terminal and to which the circuit board 2 is mounted.

The connector device 1 comprises a fiber end piece holder 25 or at least is designed for optical coupling to a fiber end piece holder 25, such as an integral fiber end piece holder comprising at least one holding piece 26 to which the fiber end pieces 31 of one or plural optical fibers 30 are mounted and by which, one or more fiber end pieces 31 are held in aligned positions relative to one another.

According to the present application, a connector device 1 is proposed which comprises a layered optical stack 10 having a number of optical layers. The layered optical stack 10 is transmissive for electromagnetic radiation transmissible via the optical fibers. The layered optical stack is designed so as to allow light propagation in a direction normal to a main surface 2a of the circuit board 2. The layered optical stack, though being mechanically connected to the circuit board, is arranged at a distance from the main surface of the circuit board, and a fiber end piece holder is coupled or couplable from above the layered optical stack, rather than directly to the circuit board. Particularly, a fiber end piece holder is coupled to the layered optical stack via a coupling adapter piece 40 couplable to a top surface 10a of the layered optical stack 10.

Figure 2:
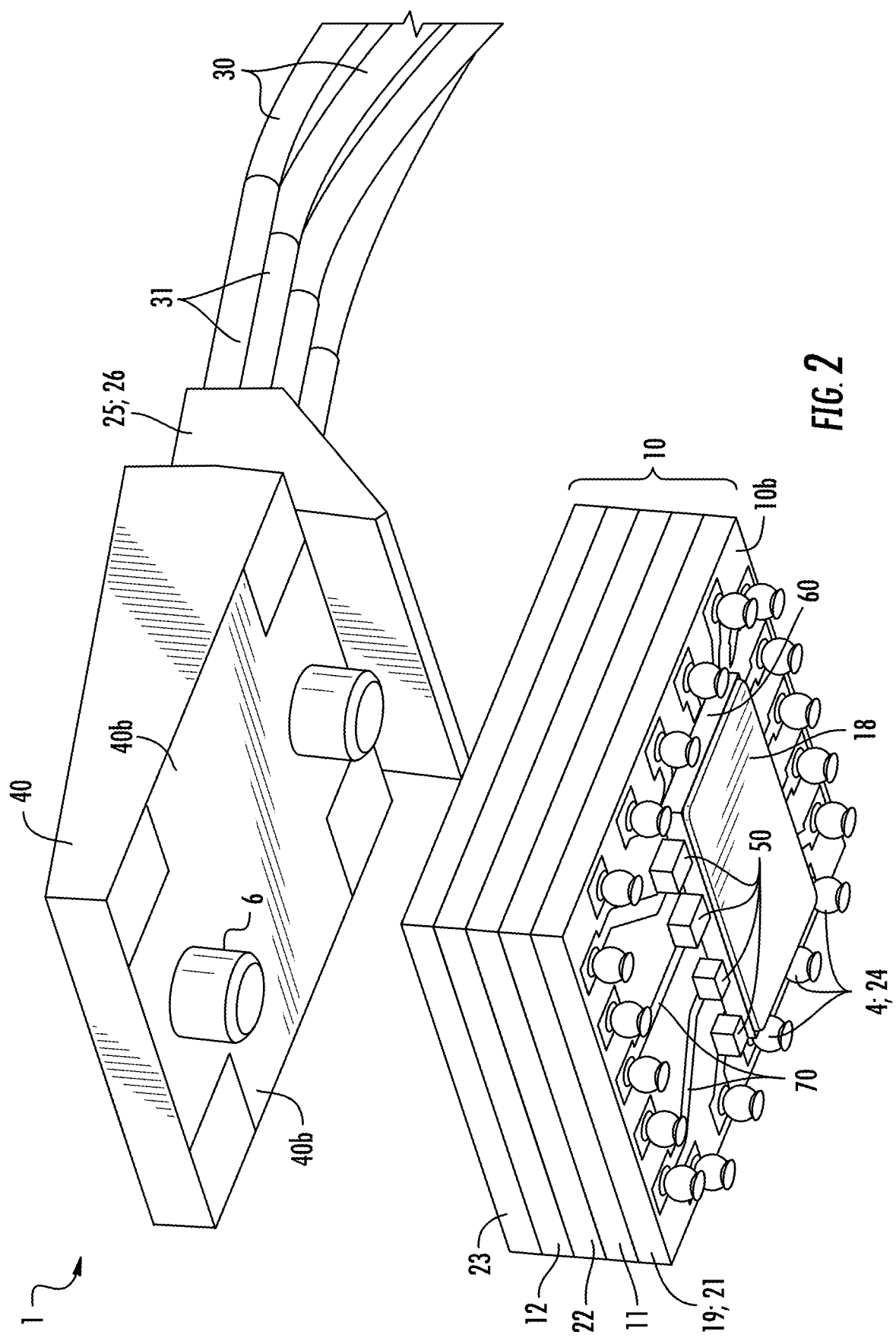
FIG. 2 shows a bottom perspective view of the embodiment of the connector device of FIG. 1.

Whereas in FIGS. 1 and 2 the layered optical stack and the coupling adapter piece of the connector device are depicted, for the sake of clearer illustration, in a disconnected state, it is to be noted that, in the connector device, they are mounted to one another.

A connector device may be provided at one end or either end of at least one optical fiber, thus providing an active optical cable couplable to an electric terminal. Furthermore, the fiber end piece holder at an end of an optical fiber and/or at an end of an active optical cable is mounted, at least detachably mounted, to the coupling adapter piece.

Whereas conventionally the optoelectronic elements for receiving and/or emitting light, such as photo diodes and laser diodes, for instance, are mounted to the circuit board or form part of an optoelectronic chip mounted to the printed circuit board (PCB) 2 or the like. According to the present application the optoelectronic chip can instead be mounted to the layered optical stack from underneath, and can thus be arranged between the circuit board and the layered optical stack 10 provided here. The layered optical stack 10 and/or the coupling adapter piece 40, which are coupled between the circuit board 2 and the fiber end piece holder 25, provide for reliable and high-efficient data transmission with minimum signal losses and, in addition, for mechanically robust connection between the fiber end piece holder 25 and the circuit board 2. Rather than being mounted to the optoelectronic chip or to the main surface 2a of the circuit board 2 directly, the fiber end piece holder 25 is coupled to the coupling adapter piece 40 which in turn is coupled or couplable to a top surface 10a of the layered optical stack. Since the layered optical stack 10 is designed for light propagation normal to the circuit board 2 whereas the fiber end pieces are approaching the fiber end piece holder 25 substantially parallel to the circuit board 2, an optical turn of between 60° and 90° is required in between. According to the present application, the optical turn is provided by means of the coupling adapter piece 40 which, either formed separately or as a component part of the fiber end piece holder 25, is mounted to the top surface 10a of the layered optical stack 10. As apparent from FIG. 1, for providing the optical turn, the coupling adapter piece 40 comprises the reflection surface 5 which may, for instance, be a recessed portion of a top surface 40a of the coupling adapter piece 40. The reflection surface 5 may be oriented at an inclination angle of between 40° and 50°, for instance of about 45° relative to the normal direction of the main surface 2a of the circuit board 2. As shown, the top surface 10a of the layered optical stack 10 as well as a bottom surface 10b thereof extend parallel to the main surface 2a of the circuit board 2. The top surface 40a of the coupling adapter piece 40, however, does not need to be parallel to the main surface 2a of the circuit board 2, not even in surface areas other than the reflection surface 5.

The coupling adapter piece 40, on its bottom surface, has at least one first engagement member 6 for engaging with at least one second engagement member 7 of the layered optical stack 10. Thereby, the coupling adapter piece 40 and the layered optical stack 10 are mechanically aligned to one another so as to ensure maximum light transmission and optimum coupling efficiency between the fiber end pieces 31 and optoelectronic elements 50 addressed further below. For instance, the at least one second engagement member 7 may be an alignment bore or alignment opening, a recess, a hole, a slot or another kind of indentation in and/or through at least an uppermost layer of the layered optical stack 10.

The layered optical stack 10 comprises a number of layers. For instance, the optical stack 10 may at least comprise a top layer 23 forming a top surface 10*a* and a bottom layer 21 forming the bottom surface 10*b* of the layered optical stack 10. The top layer 23 may particularly be a patterned layer which comprises the internal second engagement members 7 for engagement with the first engagement members 6 of the coupling adapter piece 40, thereby ensuring mounting of the coupling adapter piece 40 in an aligned position relative to the layered optical stack 10. The layered optical stack 10 may further comprise at least one intermediate patterned layer 11 disposed between the top layer 23 and the bottom layer 21. Optionally, further layers may be additionally provided between the top layer 23 and the bottom layer 21, such as an intermediate non-patterned layer 21 and/or a further patterned layer 12. Any combination or selection of these layers may be provided between the top surface 10*a* and the bottom surface 10*b* of the layered optical stack 10.

FIG. 2 is a bottom perspective view of the embodiment of the connector device of FIG. 1, showing the layered optical stack 10 from its bottom side 10*b*, without the circuit board underneath being depicted.

The layered optical stack 10 is mounted at a distance d (FIG. 5) from the main surface 2*a* of the circuit board 2. An optoelectronic chip 60 underneath the layered optical stack 10 (FIG. 2) comprises or is connected to optoelectronic active elements 50, such as photo diodes 51 or other kinds of light detecting, that is receiving active elements 52, and/or laser diodes 53, VCSELs or other kinds of emitting active elements 54. The optoelectronic chip 50 does not need to be mounted to the circuit board directly. Instead, as shown in FIG. 2, the optoelectronic chip may be mounted to the bottom side 10*b* of the layered optical stack 10, thus being in perfect alignment with the coupling adapter piece 40 on top of it. Electric connection between the circuit board and the optoelectronic chip 60 is provided by a plurality of electrical contacts 4, such as contacts forming a ball grid array 24 as shown throughout the figures. The plurality of electrical contacts 4 are directly attached to the main surface 2*a* of the circuit board 2 and to the bottom surface 10*b* of the optical stack 10 and/or to conductor lines 70 disposed thereon. The layered optical stack 10, the optoelectronic chip 60 and the coupling adapter piece 40 are supported by the plurality of electrical contacts 4. The conductor lines 70 connect the electrical contacts 4 to the optoelectronic chip 60 and/or to the optoelectronic active elements 50.

A thermal pad layer 18, such as a heat conduction plate, may be provided underneath the optoelectronic chip 60 for dissipating heat generated by the optoelectronic chip 60 towards the circuit board 2, thereby thermally coupling the optoelectronic chip 60 to the circuit board 2. Likewise, the optoelectronic elements 50 could as well be thermally coupled to the circuit board 2.

The layered optical stack 10 and the coupling adapter piece 40 ensure high coupling efficiency and provide a robust anchor for docking of the fiber end piece holder from above the optical stack 10, wherein the optical turn between the first and second propagation directions is provided by the coupling adapter piece 40 on top of the layered optical stack 10. The coupling adapter piece 40 on top of the layered optical stack 10 thus comprises a reflection surface, such as a mirror surface 5; 41 oriented at about 45° relative to the main surface of the substrate. In particular, the reflection surface 5 or areas thereof may be arranged, oriented and/or designed for enabling total internal reflection. The coupling adapter piece 40 may be a monobloc piece shaped as a block or body of bulk material, rather than as a layer.

The coupling adapter piece 40 is mounted to the top surface of the layered optical stack or, alternatively, to the layered optical stack and/or to the circuit board, such that a bottom surface 40*b* of the coupling adapter piece 40 underneath its reflection surface 5 faces and/or contacts the top surface 10*a* of the layered optical stack 10. Thereby light transmission between the layered optical stack and the coupling adapter piece 40 in perfect alignment, due to the first and second engagement members 6, 7. According to an exemplary embodiment shown throughout the figures, two first engagement members 6 and two second engagement members 7 are provided.

The layered optical stack 10 at least comprises a support layer 19 or bottom layer 21, that is a lowermost layer of the layered optical stack 10 closest to the circuit board. The bottom layer 21 forms the bottom surface 10*b* of the layered optical stack. A plurality of conductor lines 70. The conductor lines 70 may be traces or conductor lines made of copper or another metal or metal alloy. They may be applied using chemical vapour deposition (CVD), for instance.

According to an embodiment illustrated throughout the figures, the stack comprises a top layer 23 which is designed as a patterned 7 layer 23. The patterned top layer 23 may comprise one or a plurality of engagement members for mechanical engagement with the coupling adapter piece 40 or with a fiber end piece holder comprising the coupling adapter piece 40. Due to mechanical engagement of the layered optical stack and of the coupling adapter piece 40 with one another, geometrical alignment and, thereby, maximum optical coupling efficiency are achieved. Furthermore, this design of the connector device can be manufactured at low efforts and costs, especially since wafer level, i.e. substrate level or panel level techniques are applicable for forming the layered optical stack.

The layered optical stack may comprise further layers in addition. For instance, patterned optical layers 11 and/or 12 may be provided, and further non-patterned layers such as the layer 22 may be provided. Whereas the top layer 23 is patterned to comprise engagement members for mechanical engagement and alignment with the coupling adapter piece 40, the further patterned layers 11 and/or 12 are optical layers which may comprise optical surfaces or elements. In a first patterned optical layer 11, for instance, optical surfaces 16 may be formed, such as lens surfaces. They may be associated with one or some of the optoelectronic active elements 50, for instance with light-emitting or, alternatively, light-detecting optoelectronic active elements 50.

Wherever patterned optical layers are addressed in the application, they especially may be polymer layers, for instance, and they may be patterned so as to comprise optical surfaces. Furthermore, wherever the coupling adapter piece 40 is addressed in the application, it may be a polymer body which does not need to be thin or planar. Instead, it may by shaped as a three-dimensional bulk structure, as opposed to the layers of the optical stack which each have a thickness of below 1 mm. On the other hand, the top layer 23 of the layered optical stack 10, wherever addressed in the present application, may especially be a glass layer, such as a thin sheet of precision glass. Also the support layer 19, i.e. the bottom layer 21, and/or any intermediate non-patterned layer 22, wherever addressed in the present application, may also be a glass layer. Any arbitrary combination of layers may be provided, in a layered, that is stacked arrangement, to constitute the layered optical stack 10.

The coupling adapter piece 40 comprises the reflection surface 5 of the connector device 1. In FIG. 2, the reflection surface 5 is hidden by the bottom perspective view. The material of both the optical stack 10 and the coupling adapter piece 40 is transparent at least in the range of wavelengths of the electromagnetic radiation to be transmitted via the optical fibers, be it in the range of visible wavelengths or in another wavelength range, such as infrared, for instance.

The bottom surface 40b of the coupling adapter piece 40 serves as an entrance/exit surface of the coupling adapter piece 40. According to the embodiments shown in the figures, the bottom surface 40b faces and abuts the top layer 23 of the layered optical stack 10 underneath. The bottom surface 40b of the coupling adapter piece 40 is passed by signals of electromagnetic radiation when traveling between the reflection surface 5 and the optoelectronic active elements 50. On the other hand, the coupling adapter piece 40 further comprises another entrance/exit surface 20 (FIG. 8) which is passed by signals of electromagnetic radiation when traveling between the reflection surface 5 and the fiber end pieces 31, i.e. end surfaces 29 of optical fibers 31.

The reflection surface 5 of the coupling adapter piece 40 may, for instance, be an oblique sidewall of a recess which may be provided in the top surface 40a of the coupling adapter piece 40. The oblique reflection surface 5 provides the optical turn by about 90° (i.e. of between 60° and 120°, or between 80° and 100°) between a normal propagation direction, or at least substantially vertical propagation direction, between the optoelectronic elements 50 and the reflection mirror 5, on the one hand, and a substantially lateral, i.e. horizontal propagation direction between the fiber end pieces 31 and the reflection surface 5, on the other hand.

Accordingly, between the entrance and/or exit surface 20 (shown in FIG. 8) and the oblique reflection surface 5 inside the coupling adapter piece 40, the signals travel essentially horizontally, i.e. along a propagation direction at an angle of between 80° to 90° relative to the normal direction of the circuit board 2. Between the oblique reflection surface 5 and the optoelectronic elements 50 underneath the layered optical stack, the electromagnetic signals travel substantially vertically, such as along the normal direction of the stacked layers of the stack 10, thus following the direction of emission and/or receptivity of the optoelectronic elements 50. This direction is essentially along the normal direction of the main surface 2a of the circuit board 2 but, however, may be inclined relative to the normal direction by 15° at maximum.

Figure 3:
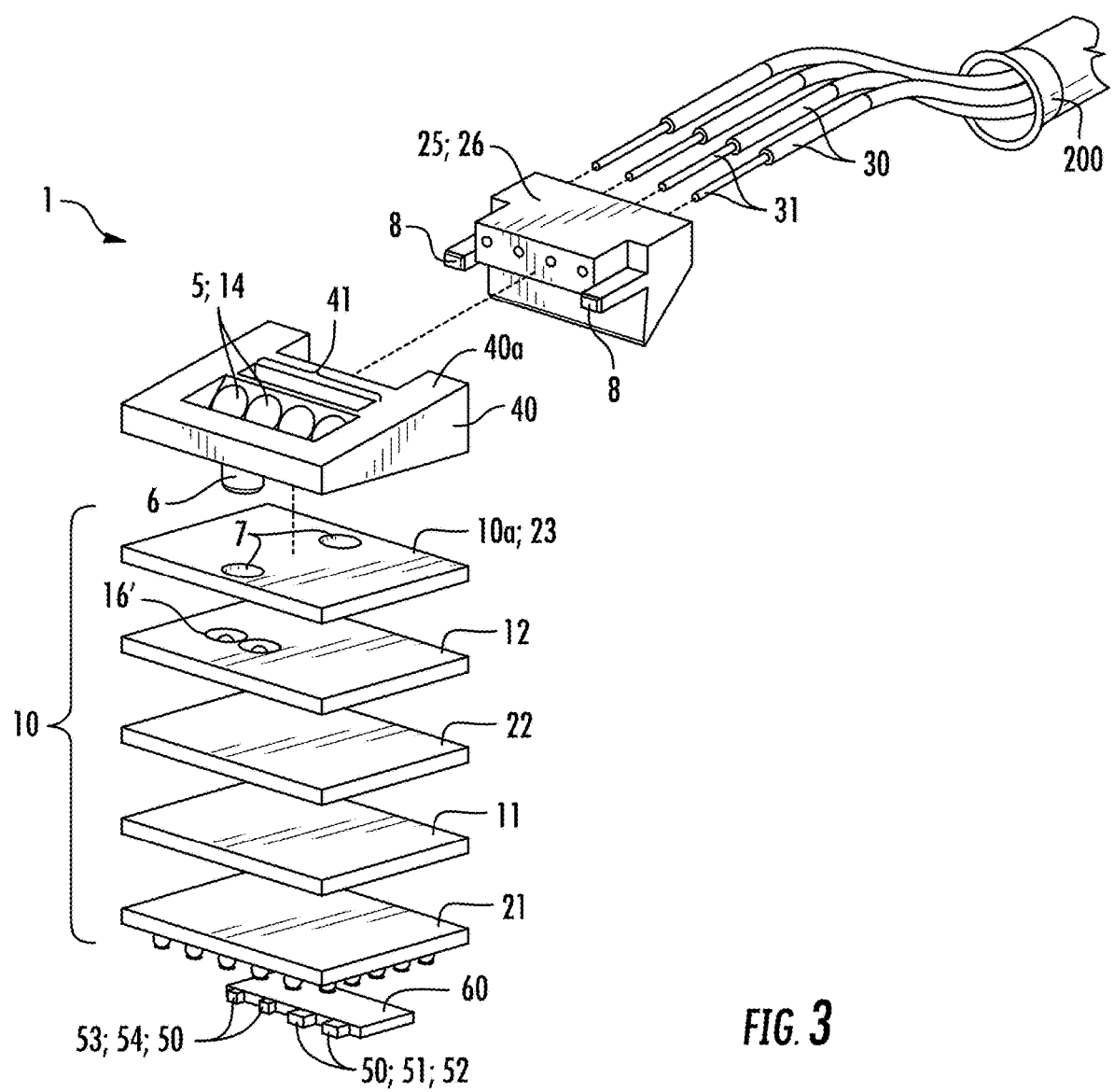
FIG. 3 shows an exploded view, in top perspective, of the connector device of FIGS. 1 and 2.

FIG. 3 shows an exploded view, in top perspective, of the connector device of FIGS. 1 and 2. As indicated in the top views of FIGS. 1 and 3, the reflection surface 5 may be designed for total internal reflection, and may optionally comprise at least one optical surface region 14, such as a lens surface. For instance, the at least one optical surface region 14 may have an elliptical or circular confinement within the reflection surface 5, within the top surface 40a of the coupling adapter piece 40 and/or within a recess of the coupling adapter piece 40. Such optical surface regions 14 may particularly be arranged in positions where light beams impinge on the reflection surface 5, i.e. at positions and/or surface areas associated with active elements, such as light emitting elements 54 (VCSELs or laser diodes 53, for instance) and/or light detecting elements 52 (photo diodes 51). According to an embodiment shown, the coupling adapter piece 40 may comprise a single, combined reflection surface 5 for the light beams of all optical fibers of the plurality of optical fibers. Alternatively, the coupling adapter piece 40 may comprise a plurality of reflection surfaces 14, each one of them being positioned and/or dimensioned for reflecting one respective radiation beam associated with a respective one of the optical fibers.

Inside the optical stack 10, in addition to the patterned top layer 23 (a glass layer comprising the second engagement members 7) and to the optional first intermediate patterned layer 11, a further patterned intermediate layer 12 may be provided which may, for instance, comprise further optical surface regions 16', such as lens surfaces at positions associated with emitting active elements 54, such as laser diodes 53 or VCSELs. In case of plural intermediate patterned layers 11, 12 provided, they may be arranged in direct contact with one another. Alternatively, they may be separated from one another by at least one intermediate, non-patterned layer 22, such as a glass layer. In the figures, two or plural intermediate patterned layers 11, 12 are shown, each comprising optical surface regions 16 and 16' either for radiation-receiving or for radiation-emitting optoelectronic active elements exclusively. Alternatively, however, a single intermediate patterned layer might be provided which comprises optical surface regions 16' and 16 for both radiation-receiving and for radiation-emitting optoelectronic active elements.

Wherever any layer of the layered optical stack 10 is addressed in the application, the layer may especially extend horizontally, that is parallel to the main surface 2a of the circuit board. The layered optical stack is a stack of layers all being parallel to the main surface 2a of the circuit board. In particular, especially the top surface 10a of the layered optical stack 10 is a surface of the uppermost layer 23 of the stack 10 which is most distant from the main surface 2a of the circuit board 2 and which layer 23 comprises only non-patterned sidewalls, especially at all four sides of a quadratic or rectangular footprint or floor plan of the layered optical stack 10. The top surface 10a of the top layer 23 faces away from the circuit board.

On the other hand, the coupling adapter piece 40, although being mounted to the top surface 10a of the layered optical stack 10, does not need to form part of the multi-layer stack 10, especially since the coupling adapter piece 40 may be shaped as a bulk adapter piece or connector body which may have a top surface 40a oriented non-parallel to its bottom surface 40b and/or to the main surface 2a of the circuit board 2. Thereby, an optical turn of an angle of between 80° and 90° may be realized by means of the coupling adapter piece 40, whereas the top surface 10a of the top layer 23 of the optical multi-layered stack 10 still is parallel to the main surface 2a of the circuit board 2. Nonetheless, the top surface 40a of the coupling adapter piece 40 may alternatively be designed to be parallel to the bottom surface 40b and/or to the main surface 2a of the circuit board 2.

By first manufacturing, as a predecessor stacked substrate, a multi-layer wafer or multi-layer substrate having lateral dimensions significantly wider than the lateral extensions of the multi-layered stack 10 of the individual connector device 1, and by subsequently sawing, dicing or otherwise singulating the multi-layer wafer or multi-layer substrate into a plurality of layered optical stacks 10, low-cost mass production of layered optical stacks 10 for a plurality of connector devices 1 is feasible. The multi-layered optical stack 10 is thus manufacturable on a wafer level basis, i.e. on a panel level or substrate level basis. In contrast thereto, the coupling adapter piece 40 is a monobloc piece or body which may be thicker, that is higher than the layered stack, especially thicker than 1.0 mm, and may optionally have an inclined top surface 40b designed to be oriented non-parallel to the circuit board. Furthermore, the coupling adapter piece 40 may have a patterned sidewall shaped to mechanically engage with a fiber end piece holder 25 or a holding piece 26 thereof. This sidewall may comprise fourth engagement members 9 for mechanical engagement with third engagement members 8 comprised in the fiber end piece holder 25 or a holding piece 26 thereof (see further below).

As regards the layered optical stack 10, the top layer 23 represents a first, uppermost patterned layer 23 thereof. The top surface of the non-patterned top layer 23 is the top surface of the layered optical stack 10 and may be patterned so as to include the second engagement members 7, for instance two second engagement members 7, for mechanical engagement with first engagement members 6 comprised at the bottom side of the coupling adapter piece 40.

Wherever the support layer 21, the top layer 23 and/or the intermediate, non-patterned layer 21; 22; 23 is addressed in the application, it or they may be, for instance, a glass layer or a glass sheet, such as a sheet of high-precision glass. The layers 21 and 22 may be non-patterned. The term 'non-patterned' means that there are no internal patterns, such as indentations, through-holes, protrusions, be it datums for mechanically mating alignment with further elements with components of the connector device, be it for shaping optical surface regions, such as lens surfaces. Instead, the non-patterned layers may be provided to increase the robustness, mechanical stability and/or hardness of the layered optical stack 10. During panel level fabrication, the exterior layers 21 and 23 serve to seal and thereby protect the intermediate layers of the substrate or wafer from being warped, cracked or contaminated, especially in the dicing/sawing procedure, for instance during laser cutting, i.e. laser dicing, or during mechanical sawing, i.e. mechanical dicing. Especially, the top and bottom layers 23, 21 protect the intermediate layer or layers 11; 22; 12 during singulation of the wafer or predecessor substrate. Wherever in this application any of the layers 21, 22 or 23 is addressed, it may, for instance, be a glass layer, and wherever in this application an intermediate, patterned layer 11 and/or 12 is addressed, it may, for instance, be a polymer layer.

The patterned layers, such as the patterned top layer 23 or, the intermediate patterned layers 11 and/or 12, comprise optical surface regions 14, 16, inside their footprint area, at their top and/or bottom surfaces. The four lateral sidewalls of the intermediate patterned layers 11 and/or 12 of the layered stack 10 are planar, without any patterns, and are thus obtainable simply by sawing, dicing or otherwise singulating a stacked piece out of a wafer, panel or other kind of much wider predecessor substrate. Thereby the lateral contours of the layered optical stack of the connector device shown in FIG. 1 are obtained. On the other hand, as to the coupling adapter piece 40, at least one sidewall thereof may comprise a pattern representing the at least one fourth engagement member 9. The coupling adapter piece 40 thus comprises as least one sidewall in which another entrance/exit surface 20 is provided which is to be passed by the radiation beams prior to or subsequent to passing the optical turn at the reflection surface 5. Thus, whereas the at least one fourth engagement member 9 forms part of at least one sidewall of the coupling adapter piece 40, the sidewalls of the layered optical stack 10 and of its layers do not need to bear any mechanical engagement members or optical surface regions. Instead, they can be planar and flush with one another, especially since the width of the propagation path or radiation beam through the layered optical stack 10 has a lateral distance from all stack sidewalls and, furthermore, from the lateral positions of the second engagement members 7 of the top layer 23 of the optical stack 10.

The material of the layers of the optical stack 10 are chosen appropriately with regard to their refractive index and their function and treatment during manufacture, and they are all transmissive at least in the wavelength range used for transmission via the optical fibers 30, which may be within the visible range of light or in the infrared range, for instance. The term 'optical' used in connection with the layered optical stack 10 or a layer thereof shall only denote that 'optical' imaging or at least concentration or guidance of rays of electromagnetic radiation is to be achieved by the particular orientation, shape and/or curvature of the layers and/or the surfaces thereof.

It is to be noted that the figures are not necessarily to scale. However, the figures at least qualitatively indicate that the thickness or height of the coupling adapter piece 40 is larger than the thickness of any of the layers of the layered optical stack 10. The thickness of layered optical stack 10 underneath the coupling adapter piece 40 may be about 1.5 mm, and the total height of the layered optical stack 10 plus the coupling adapter piece 40 and the fiber end piece holder 25 may be about 2.5 mm, for instance.

Figure 4:
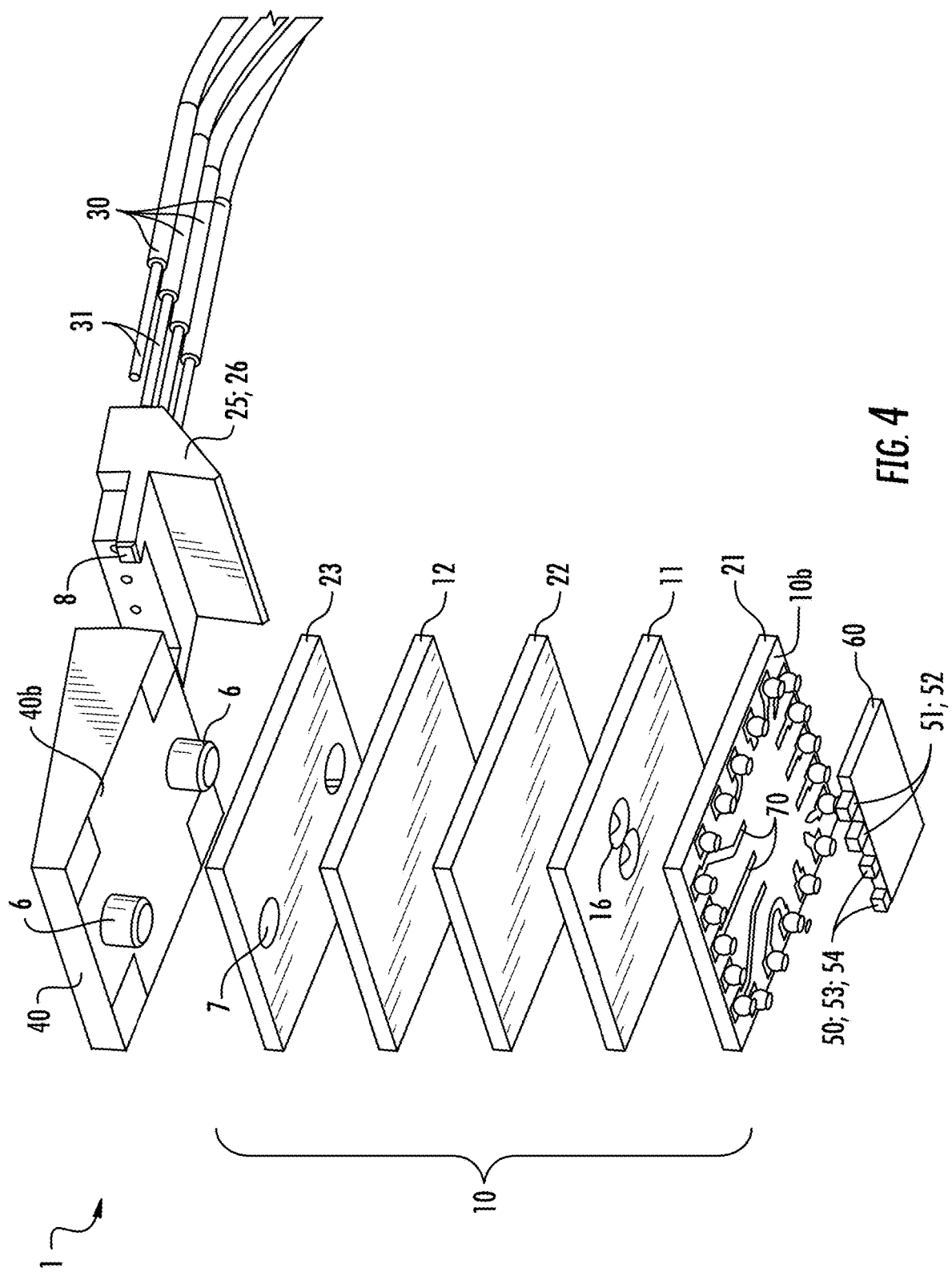
FIG. 4 shows an exploded view, in bottom perspective, of the connector device of FIGS. 1 to 3.

FIG. 4 shows an exploded view, in bottom perspective, of the connector device of FIGS. 1 to 3. In the bottom perspective view of FIG. 4A, the optoelectronic chip 60 underneath the bottom surface 10b of the layered optical stack 10, and the optoelectronic active elements 50, are shown more clearly. The optoelectronic active elements 50 may be comprised in the optoelectronic chip 60 or may be mounted to and/or contacted by the optoelectronic chip 60. As regards the optoelectronic active elements 50, in the present application embodiments with two laser diodes or VCSELs 53 and with two photo diodes 51 are shown. However, any other combination and/or arrangement of optoelectronic active elements 50 can be realised. For instance, any number of light emitting active elements 54 and/or light detecting active elements 52 may be chosen instead. Inter alia, instead of bi-directional connector devices and active optical cables comprising them, likewise uni-directional devices with either light detecting elements 52 or light emitting active elements 54 exclusively may be provided. The optoelectronic chip 60 my be mounted to the bottom layer 21 of the optical stack 10, that is to the conductor lines 70 on its bottom surface 10b, by means of flip chip techniques. The bottom layer 21 or support layer 19 represents an interposer layer for supporting the upper layers of the layered stack 10 and, in addition, for fabricating and/or mounting of the conductor lines 70, the contacts 4 and the optoelectronic chip 60 from underneath.

In FIGS. 3 and 4, a coupling region of the fiber end piece holder 25 is shown which is to face and to be coupled to the lateral entrance/exit surface 20 of the coupling adapter piece 40. FIGS. 3 and 4 show third engagement members 8 of the fiber end piece holder 25 for coupling to fourth engagement members 9 of the coupling adapter piece 40. FIGS. 3 and 4 further show the individual fiber end pieces 31 which are to be inserted in and guided by the fiber end piece holder 25 and/or through a bridge region 41 (FIG. 3) of the coupling adapter piece 40. Each fiber end piece 31 comprises one respective fiber end surface 29 (FIG. 7) facing the lateral entrance/exit surface 20 of the coupling adapter piece 40 in an aligned position and orientation. Along a distal end close to the fiber end surface 29, the fiber end piece 31 is uncoated. FIG. 4 further shows optical surface regions 16 at the bottom surface of the optional first, lower patterned layer polymer 11, which optical surface regions 16 face the detecting active elements 52, such as photo diodes 51.

In all embodiments of the application, the optoelectronic chip 60 may, for instance, be mounted to the bottom side 10a of the lowermost layer of the layered optical stack. Although not illustrated in FIG. 4, between the chip 60 and the circuit board 2, a thermal pad or heat conduction plate 18 (see FIGS. 2, 6 and 10) may be provided for cooling the chip 60. Furthermore, as shown in FIGS. 2 and 4, between the chip 60 and the bottom layer 21 of the multi-layered stack 10, the conductor lines 70 extend laterally for electrically connecting the optoelectronic chip 60, via the electric contacts 4, to the circuit board 2. The contacts 4 may, for instance, form a ball grid array 24.

All layers of the optical stack 10 shown in the figures of the application may adhere to one another by means of an appropriate adhesive (not shown) or, alternatively, may be fixed to one another due to application of heat and/or mechanical pressure. Furthermore, the layers of the optical stack 10 may simply be bonded or laminated together, for instance using current bonding and/or alignment processes. Especially during panel level or wafer level manufacture used as a cost-efficient large-scale production method, provision of additional adhesive films between the layers of the stack 10 and/or application of heat and/or mechanical pressure in the normal direction of the stack 10 or, alternatively, bonding techniques or lamination techniques, may be applied.

Figure 5:
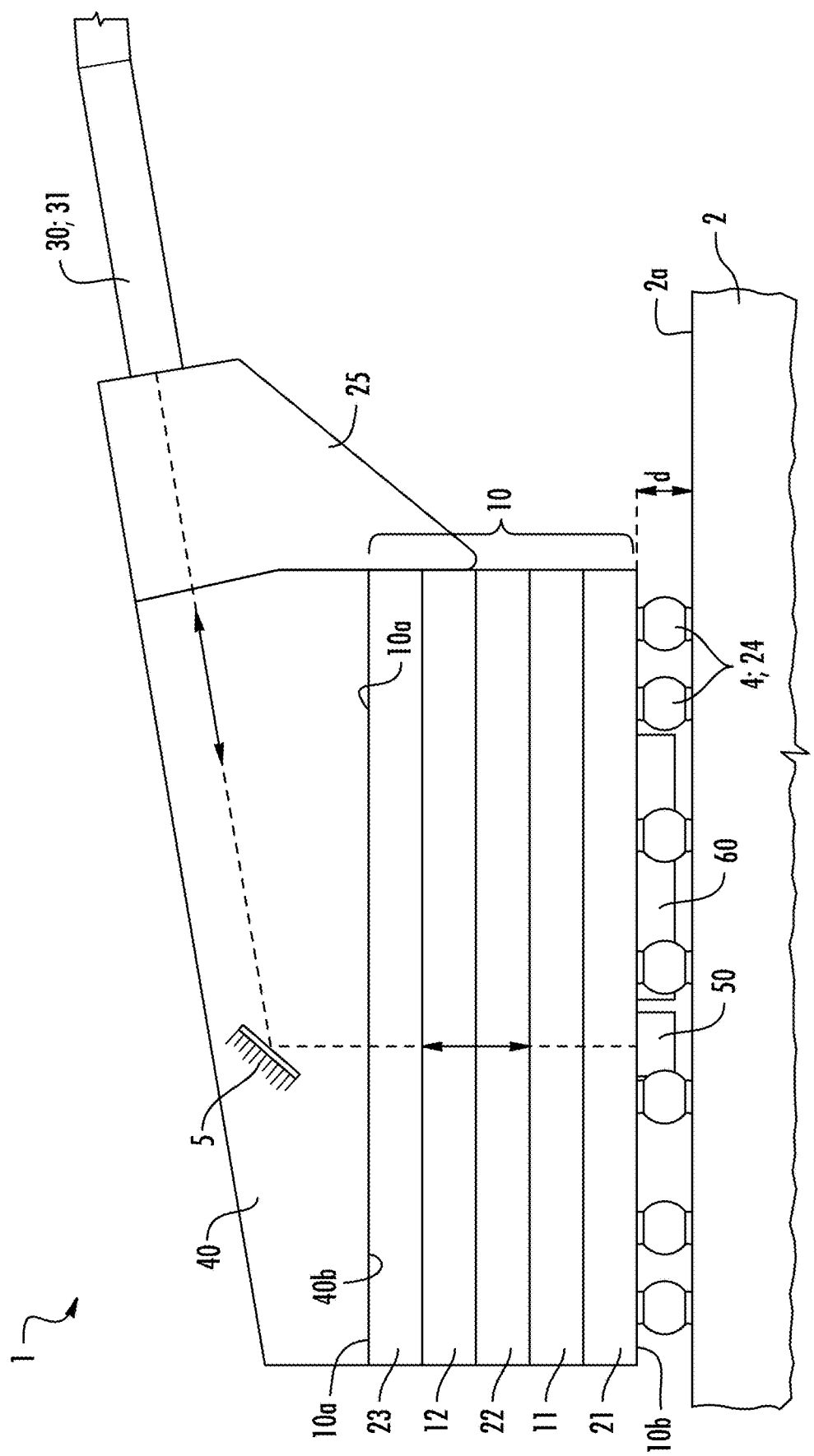
FIG. 5 shows a side view of the connector device of FIGS. 1 to 4.
Figure 6:
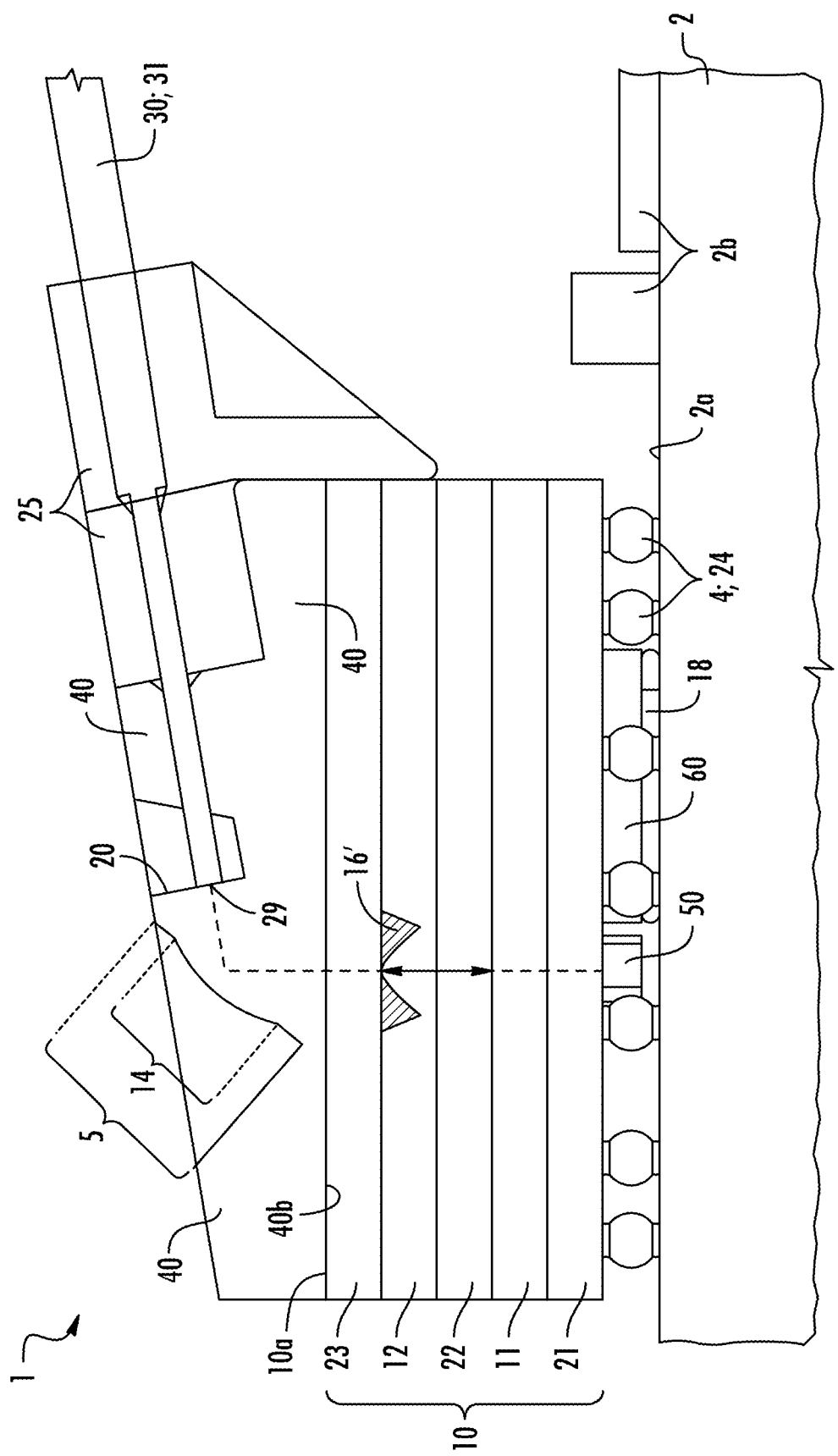
FIG. 6 shows another side view of the connector device of FIGS. 1 to 5, with further details inside the layered optical stack and the coupling adapter piece being shown.
Figure 7:
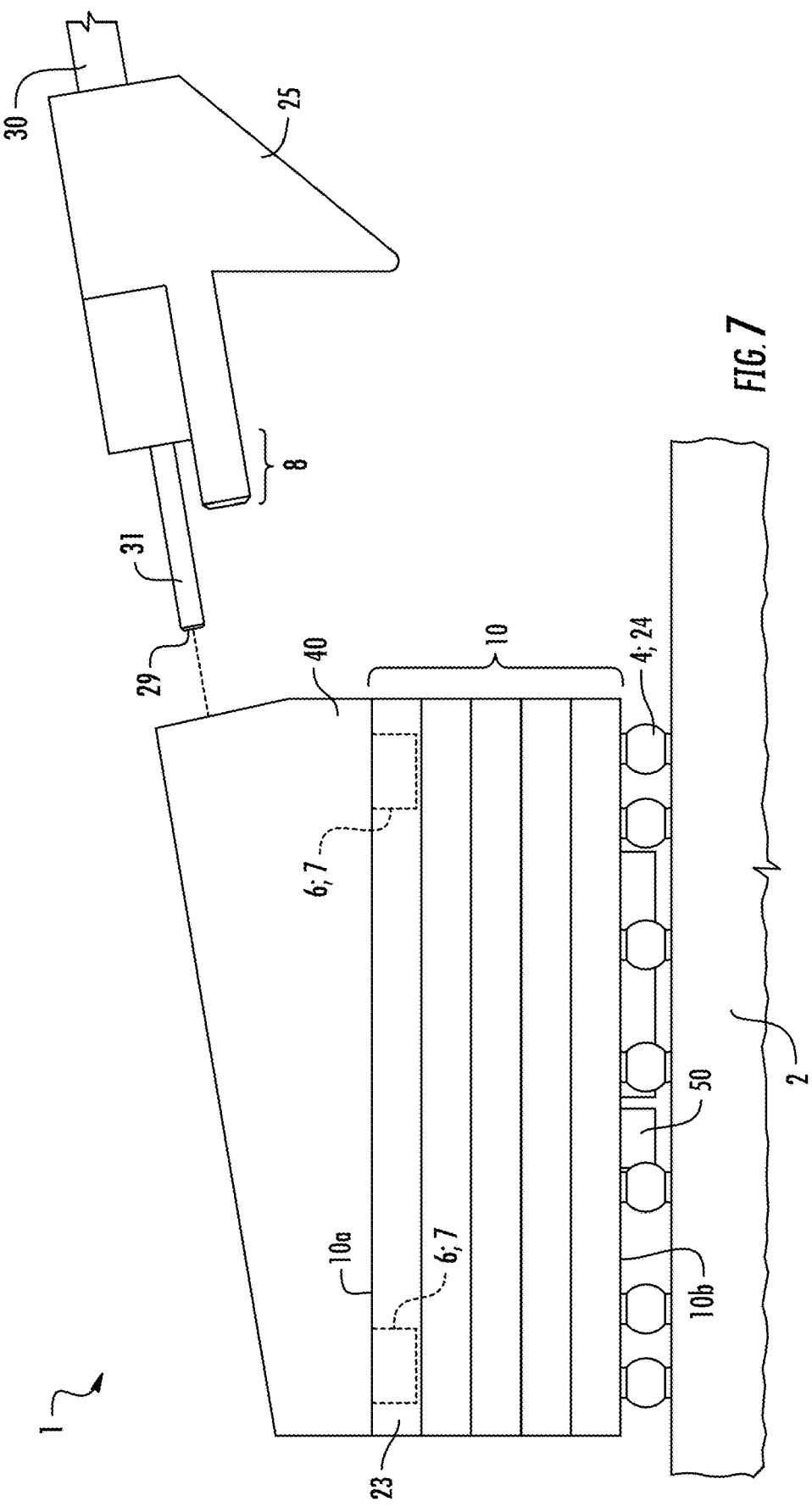
FIG. 7 shows a further side view of the connector device of FIGS. 1 to 6, with the fiber end piece holder being shown disconnected from the coupling adapter piece.

FIGS. 5 to 7 show side views of the connector device of FIGS. 1 to 4. In FIG. 5, the overall inclination angle of the mirror 5 above the active elements 50 is indicated. Furthermore, the first and second directions of propagation of electromagnetic radiation substantially normal to and substantially parallel to the main surface 2a of the circuit board 2 are indicated by arrows. The first propagation direction substantially corresponds to the normal direction of the main surface 2a of the circuit board 2, whereas the second propagation direction is inclined, relative to the normal direction of the main surface 2a of the circuit board 2, by an inclination angle of between 70° and 90°, thus being substantially parallel to the surfaces of the stack 10 and of the circuit board 2. As further apparent from the side view of FIG. 5, the layered optical stack 10 is arranged at a distance d from the main surface 2a of the circuit board 2. In FIG. 5, the optional thermal pad underneath the optoelectronic chip 60 is not shown explicitly.

According to the figures of the present application, the fiber end piece holder 25 is mounted, via third engagement members 8 such as prongs, teeth, pins or other kinds of protrusions, for instance, which engage with the fourth engagement members 9 of the coupling adapter piece 40. The coupling adapter piece 40 and the layered optical stack 10 underneath thus provide for robust mounting of the fiber end piece holder 25 to the circuit board 2 and for precise alignment of the fiber endpieces 31, especially their fiber end surfaces 29, to the optoelectronic active elements 50. Thereby, the end surfaces 29 of the fiber end pieces 31 approach the entrance/exit surface 20 of the coupling adapter piece 40 in properly aligned positions and/or orientations. Thus, efficient optical coupling to the active elements 50, via the inclined reflection mirror 5, with minimum signal losses is ensured. The fiber end piece holder 25 of FIGS. 5 to 7 may be is a one-piece, integral monobloc piece and may represent a laterally insertable holding piece 26. It may carry third engagement members 8 formed as protrusions. Alternatively, it may be composed of plural parts or holding pieces. Furthermore, alternatively, the third engagement members 8 may be indentations for engagement with fourth engagement members 9 of the coupling adapter piece 40 designed as protrusions. Anyway, the fiber end piece holder 25 is mechanically mountable to the coupling adapter piece 40 above layered optical stack 10, rather than to the circuit board 2 or to the stack 10 directly.

FIG. 6 shows some further details inside the layered optical stack 10, the coupling adapter piece 40 and the fiber end piece holder 25. The fiber end surfaces 29 are facing and/or contacting the lateral entrance/exit surface 20 of the coupling adapter piece 40 in aligned positions, especially along the two directions parallel to the entrance/exit surface 20. Inside the layered optical stack 10, the optical surfaces 16'; 16 of at least one patterned polymer layer 11; 12 may be provided in aligned positions relative to the passing radiation beams, especially in the two directions parallel to the main surface 2a of the circuit board 2. FIG. 6 further schematically shows some circuitry 2b provided on the main surface 2a of the circuit board 2 as well as the thermal pad 18 underneath the optoelectronic chip 60.

The connector device 1 proposed in the present application may or, alternatively, may not comprise a fiber end piece holder 25. If may suffice to provide the coupling adapter piece 40 on top of the layered optical stack 10. A fiber end piece holder 25 is then easily mountable to the coupling adapter piece 40 of the connector device 1 at any later point in time, for instance when assembling an active optical cable 200 and/or when connecting an active optical cable 200 to an electric terminal.

FIG. 7 shows the connector device 1 before a fiber end piece holder 25 is coupled to its coupling adapter piece 40. Apart from the third engagement members 8 of the fiber end piece holder 25, the fiber end surfaces 29 to be inserted in the coupling adapter piece 40 are shown. Furthermore, the engagement of the first and second engagement members 6; 7 with one another is indicated in FIG. 7.

Figure 8:
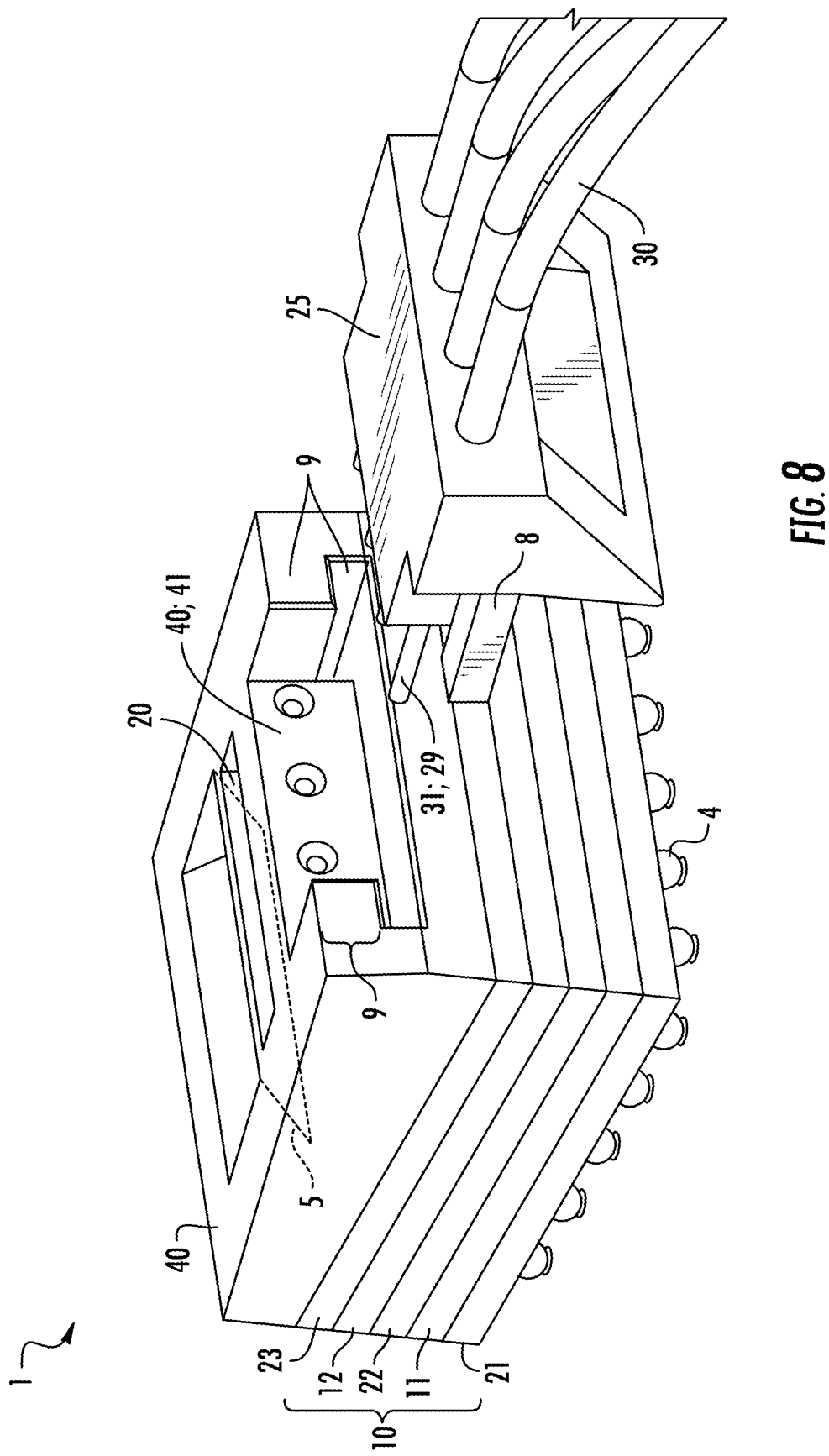
FIG. 8 shows a perspective cross-sectional view corresponding to FIG. 7.

FIG. 8 shows a perspective cross-sectional view corresponding to FIG. 7. Whereas the layered optical stack 10 and the coupling adapter piece 40 may be irreleasably fixed to one another on top of the circuit board 2 to form a combined coupling stack, the fiber end piece holder 25 is still to be fixed to the combined coupling stack, i.e. either releasably fixed or irreleasably fixed. As shown in FIG. 8, the third engagement members 8 have to be engaged with fourth engagement members 9 of the coupling adapter piece 40. The fiber end pieces 31 may be inserted and guided through openings in a bridge region 41 of the coupling adapter piece 40 until the fiber end surfaces 29 abut or, alternatively, come to rest closely ahead of the entrance/exit surface 20 of the coupling adapter piece 40. In the figures of the application, four exemplary fiber end pieces 31 of four optical fibers 30 are coupled by means of the fiber end piece holder 25. Furthermore, the inclined reflection surface 5 is shown in dashed lines.

Figure 9:
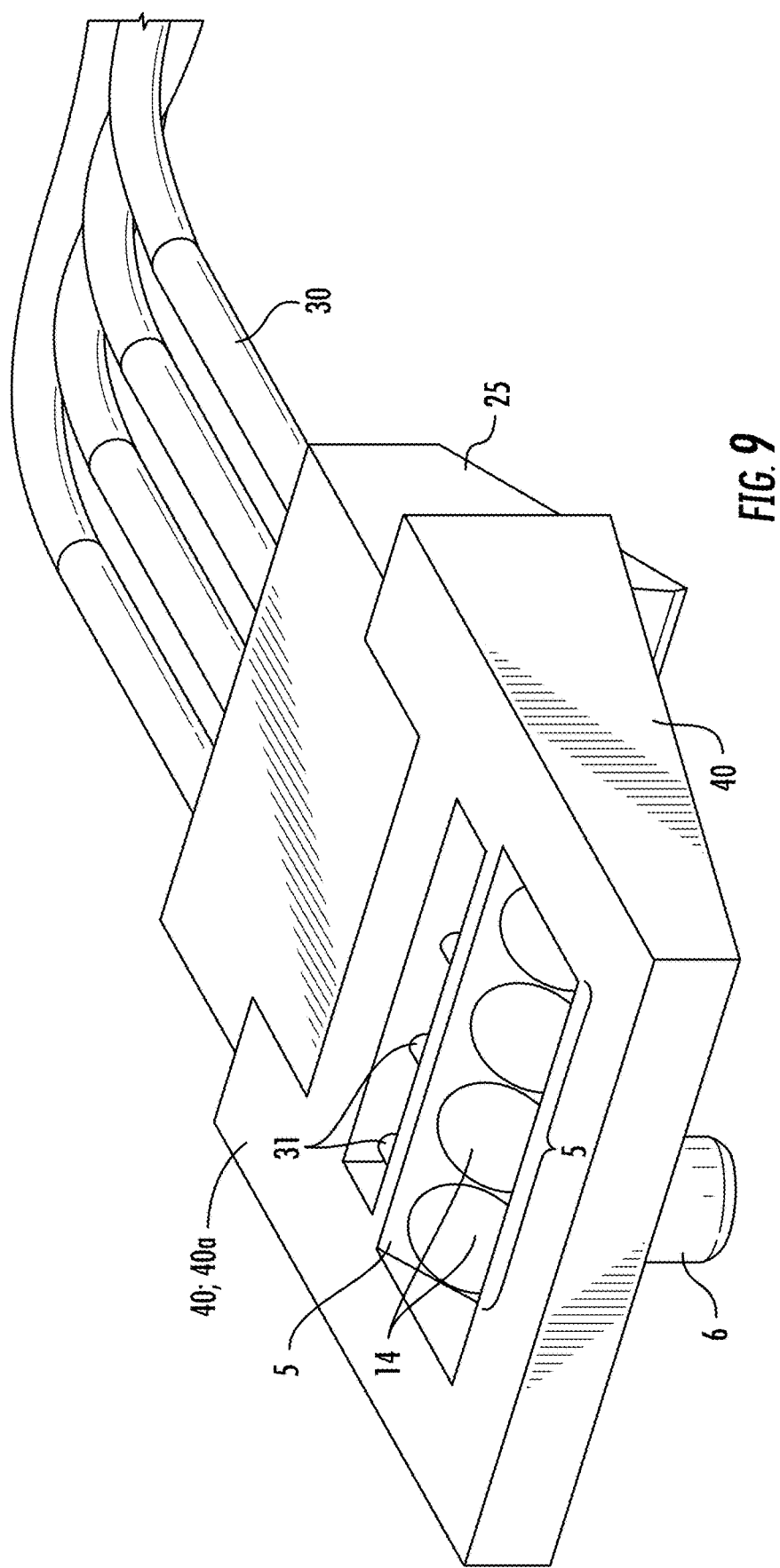
FIG. 9 shows another perspective view of the coupling adapter piece and of the fiber end piece holder coupled to it.

FIG. 9 shows another perspective view of the coupling adapter piece 40 and of the fiber end piece holder 25 coupled to it. As apparent form FIG. 9, optional first optical surface regions such as lens surfaces 14 may be provided in the reflection surface 5.

Figure 10:
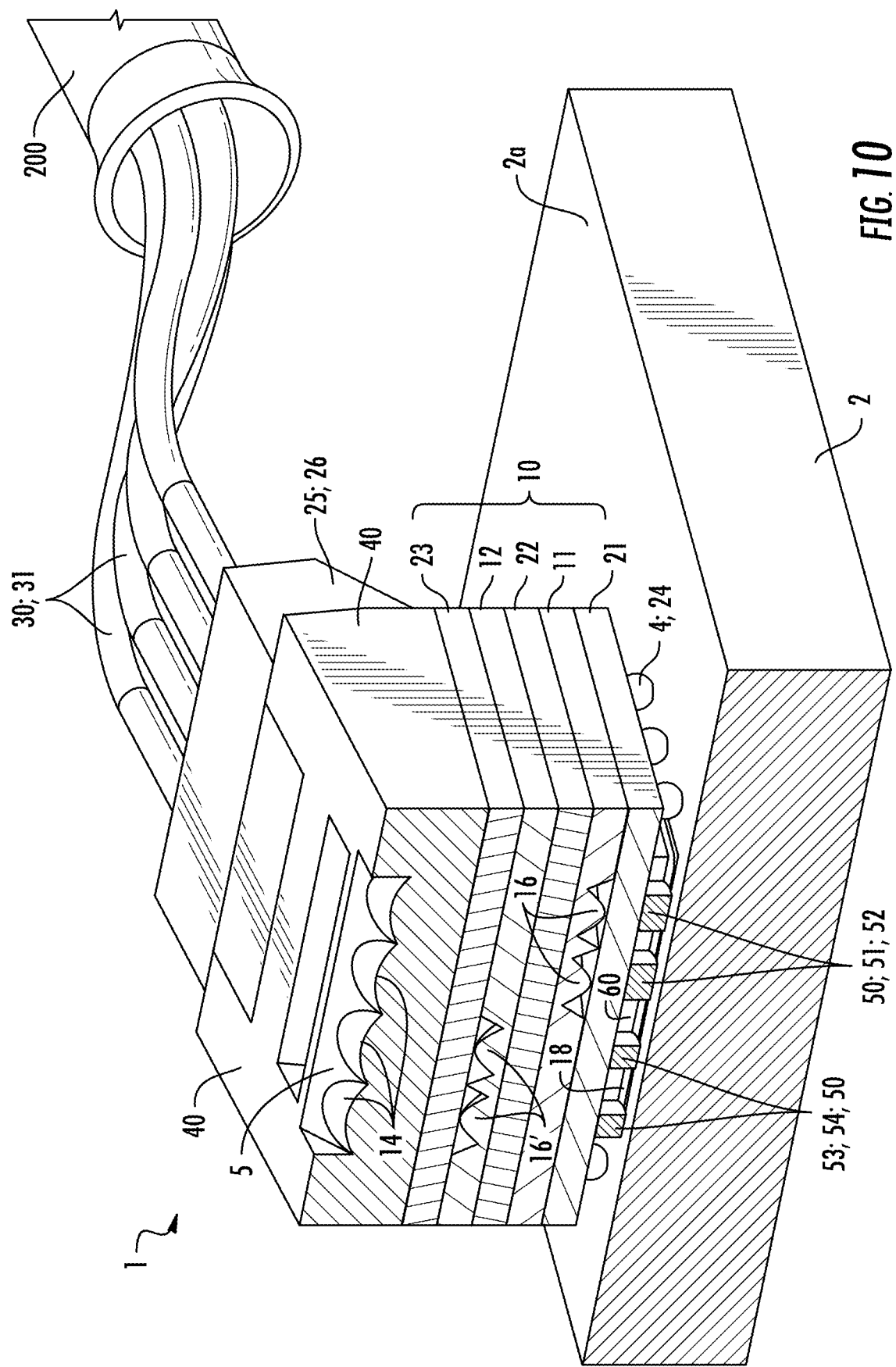
FIG. 10 shows a perspective sectional view through the connector device; the intersecting plane intersecting a layered optical stack, a coupling adapter piece and a plurality of optoelectronic active elements.

FIG. 10 shows a perspective sectional view through the connector device 1, with a fiber end piece holder already mounted to it and/or comprised as a part of it. The intersecting plane (drawing plane) intersects the coupling adapter piece 40, the layered optical stack 10 and the plurality of optoelectronic active elements 50. As in FIGS. 2 to 4, the individual optoelectronic active elements 50 are shown individually, two of them being radiation-emitting and the other two of them being radiation-detecting. As apparent from the sectional view through the one-piece, monobloc body of the coupling adapter piece 40, the reflecting mirror surface 5 may be shaped such as to comprise lens surface regions 14 for each of the light beams to be reflected. Furthermore, different optical lens surfaces 16 and/or 16' may be provided in at least one patterned, intermediate layer 11; 12 of the layered optical stack 10 so as to optimize the optical paths above the photo diodes, laser diodes, VCSELs, or other kinds of optoelectronic active elements 50.

Whereas in the present application the part or component denoted with 40 is called the coupling adapter piece 40 which according to the exemplary embodiments is mounted on top of the layered optical stack 10, it can also be designed to form part of the fiber end piece holder 25 which is to be attached directly to the (second) engagement members 7 provided at the layered optical stack 10, i.e. from above the layered optical stack 10. Further, alternatively, the coupling adapter piece 40 and the layered optical stack 10 may combinedly form a stacked counterpart piece 10; 40 to which the fiber end piece holder 25 or a holding piece 26 thereof is coupled to or couplable to. Accordingly, it is to be noted that the particular naming of the part or component 40 is not necessarily regarded as a constructional limitation.

In the figures of the application, any beam of light or radiation exiting the end surfaces of the fiber end pieces 31 will enter the entrance/exit surface 20 of the coupling adapter piece 40 and will then be totally internally reflected by the oblique reflection surface 5; 14. Reflection may occur in curved optical surface regions, such as lens surface regions 14 comprised in the reflection surface 5, so as to additionally concentrate, focus or even image the beam of radiation when reaching the corresponding optoelectronic element 50 of the chip 60.

The reflection mirror 5; 14 and/or the optional optical surface regions 16, 16' in the layered stack 10 qualify the stack as a micro-optical stack, that is a stack comprising micro-optical elements having dimensions in the sub-millimeter range. For instance, the stack 10 may have a total height of only 1.5 millimeters. The stack 10 may be a diced piece of a predecessor substrate and may thus comprise at least one wafer scale optics layer 11; 12 and/or at least one wafer precision glass micro-alignment pattern layer 23 comprising at least one micro-alignment pattern usable as engagement member 6. Thereby, wafer scale optics and wafer scale alignment datums can be integrated in the layered optical stack 10. For instance, precision imprint polymer layers 11; 12, especially lens bearing imprint polymer layers 11; 12, usable in combination with VCSELs or photo diodes, can be formed.

As an exemplary design, the top layer 23 may have a thickness, that is height, of 0.4 mm, due to its function as a mechanical coupling and/or alignment layer. The intermediate patterned layers 11, 12 and/or the intermediate non-patterned layer 22 may have a thickness of 0.2 mm each. The bottom or support layer 21 (interposer layer) may have a thickness of 0.2 mm. In one embodiment, the top and bottom layers 21; 23 are glass sheets or glass plates for providing mechanical protection and stability, especially for protection during embossing or otherwise forming and/or stacking the layers, and/or during cutting, dicing or otherwise singulating the individual layered optical stacks 10 out of a layered predecessor substrate or wafer, but other materials are possible. The electrical contacts, such as ball grid array contacts, may have a height, or at least provide a distance between the main surface 2a of the circuit board 2 and the bottom surface 10b of the layered optical stack, of between 0.1 and 0.6 mm, especially between 200 and 400 mm, such as 0.2 mm, for instance. The footprint of the layered optical stack 10 and/or of the coupling adapter piece 40 may be 3.0×3.0 mm$^2$. The pitch distance between the contact balls 4 of the ball grid array may be about 0.5 millimeters.

The layered optical stack 10 represents a modular compound or component part, that is a modular building block, which is producable, as a fully integrated building block, by means of customary stack and saw, optionally including wafer scale optics manufacture and wafer scale alignment mark application. Upon singulation and cleaning, the layered optical stack 10 is directly usable, as a pre-fabricated sub-assembly, for assembling the connector device 1, particularly for mounting the coupling adapter piece 40, as a prism-like connector and/or pluggable connector, to it from above. The layered optical stack 10, as a modular building block, is usable in embedded solutions and products, for instance for Quad Small Form-factor Pluggable devices (QSFP) or for related data center applications, designs or variants of active optical cables. Furthermore, connector devices 1 constructed as proposed here may be used for transceivers, mod-board optical modules or any other device or electronic component.

The design using the layered optical stack 10 and the coupling adapter piece 40 obviates the need to individually manufacture and mechanically assemble a diversity of complicatedly designed component parts for carrying and positioning the respective micro-optical elements. On top of that, precise alignment is automatically ensured when the layered optical stack 10 and the coupling adapter piece 40 are mounted to one another. Production costs and efforts are thus reduced significantly. The glass and polymer layers, such as any alignment layer 23 or the wafer scale micro-optics layers 11, 12, of the layered optical stack 10 can be produced using massive replication of a mold master for designing any of the stacked layers of the stack 10, on a wafer level basis. Due to wafer level manufacture, a plurality of patterned or specifically designed surface areas (such as lens surfaces, reflection surfaces, engagement members or other alignment datums and/or micro-optical elements, for instance), which are destined for a plurality of layered optical stacks 10 of respective connector devices 1, may simultaneously manufactured and aligned with a single layer-to-layer alignment step or with only a handful of layer-to-layer alignment steps. The coupling adapter piece 40 may be designed as a low profile horizontal connector for coupling and laterally plugging in the fiber end piece holder 25. Apart from polymer layer imprint processes, glass interposer technologies may be applied, especially for forming and/or shaping sheets of precision flat glass, for fabricating electrical traces 70 on them and/or for placing active optoelectronic devices onto them.

FIGS. 11 to 20 show steps of an exemplary way of realising a method of efficiently manufacturing a plurality of connector devices capable of connecting fiber end pieces.

Figure 11:
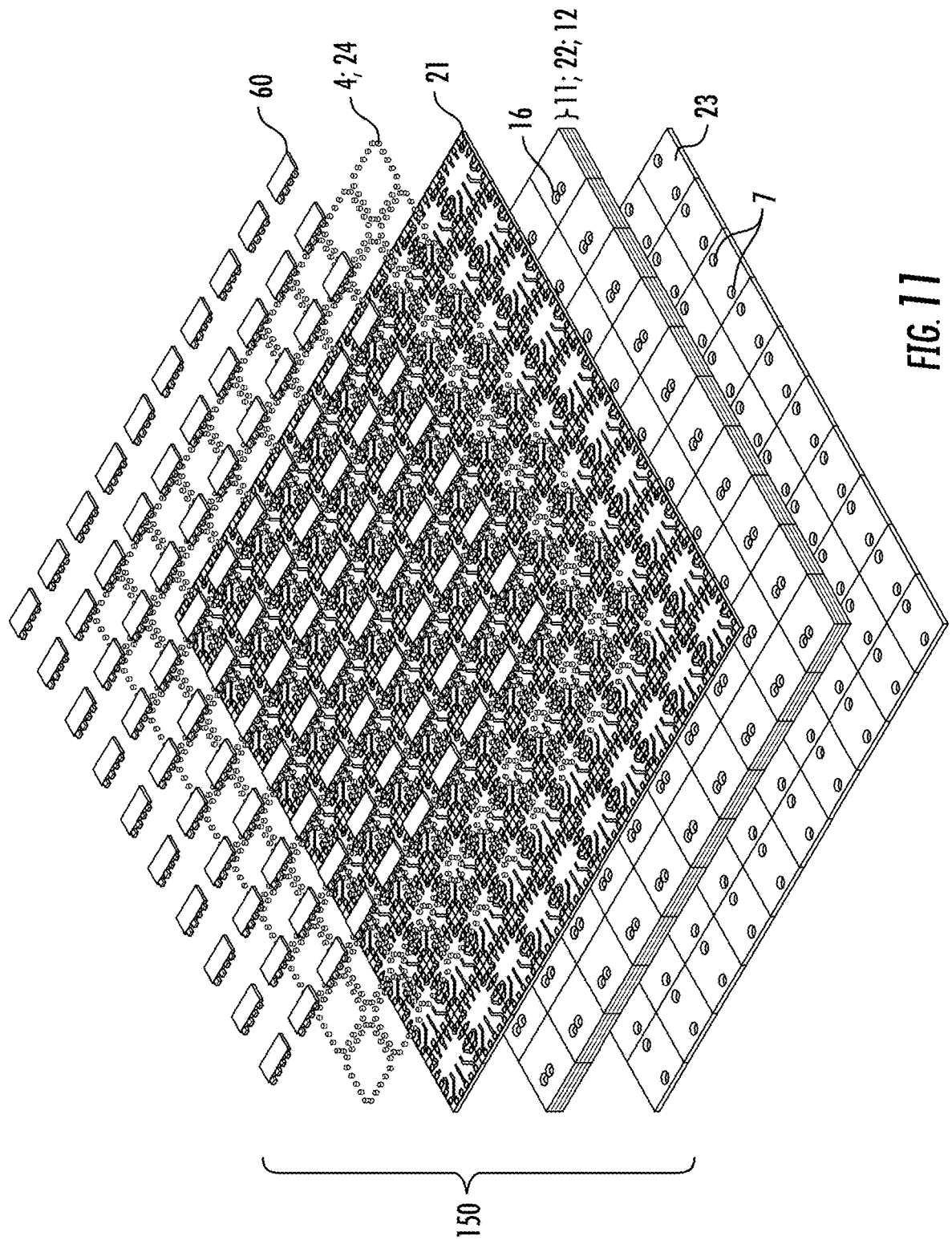
FIGS. 11 to 20 show steps of an exemplary method of manufacturing a plurality of connector devices.

FIG. 11 shows an exploded view of layers and further components of an array of multi-layer stacks 10 combinedly and simultaneously formed on a wafer level basis, i.e. substrate level basis. Thereby, a multi-layer substrate such as a micro-optical panel or wafer, that is a layered substrate stack 150 (predecessor substrate) of much wider lateral dimensions than the final optical layered stack 10 is formed.

The layered substrate stack 150 at least comprises a first layer, which later may represent the top layer 23 of a plurality of layered optical stacks 10, and a second layer, which later, after the layered substrate stack 150 will have been singulated into a plurality of layered stacks, may represent the support layer 19 or bottom layer 21 of the plurality of layered optical stacks 10.

Figure 12:
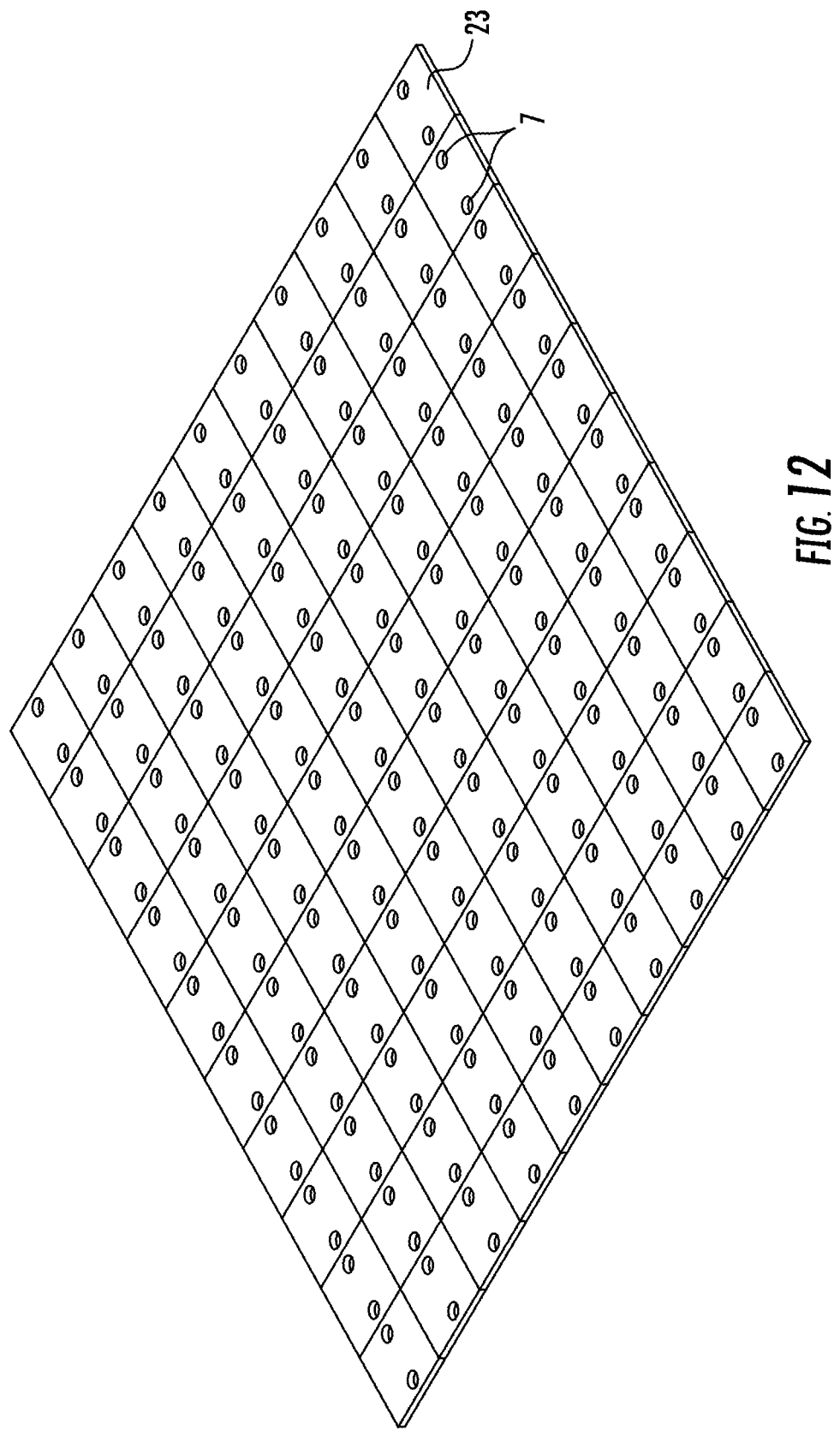
Figure 13:
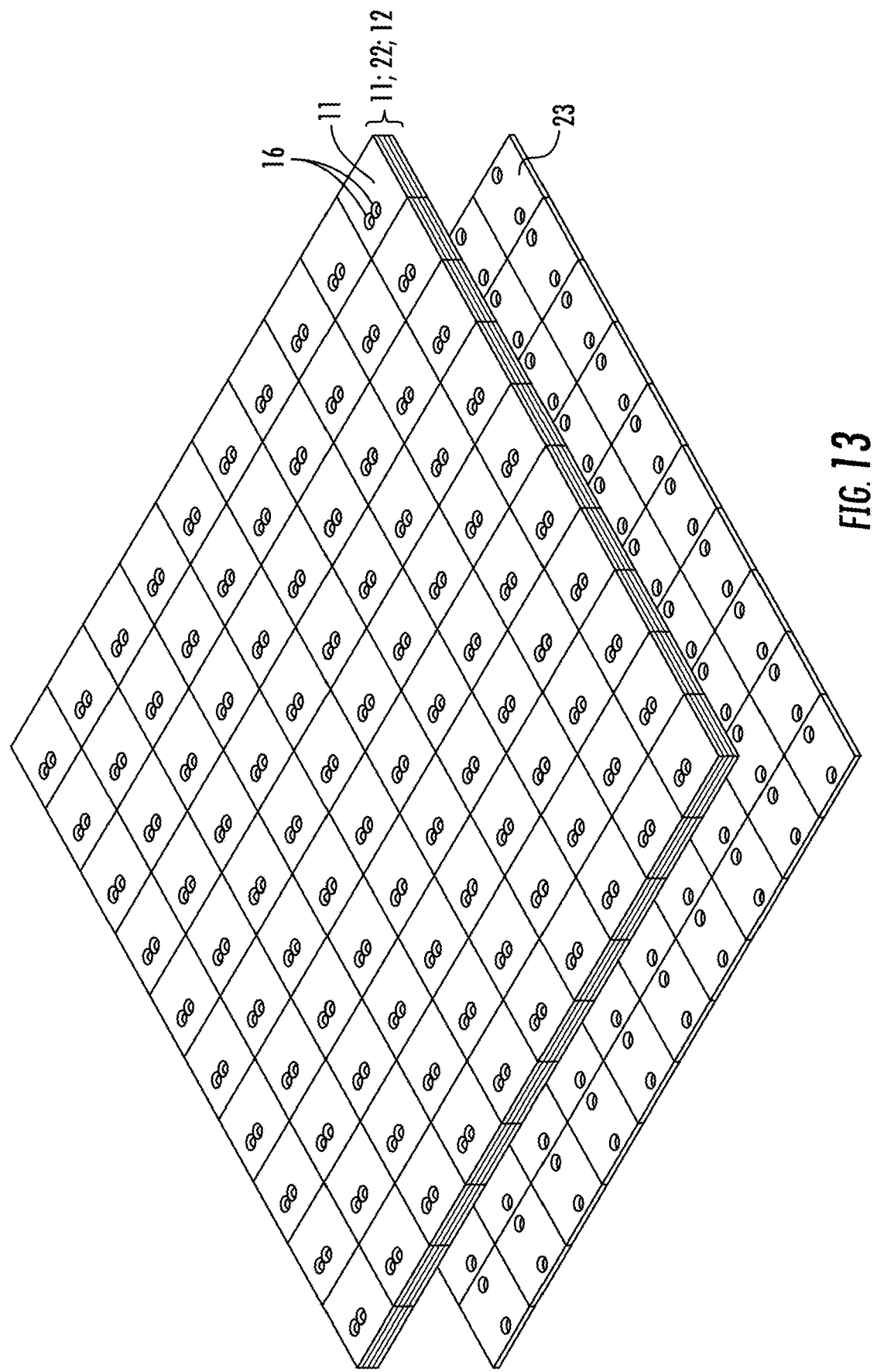
Figure 14:
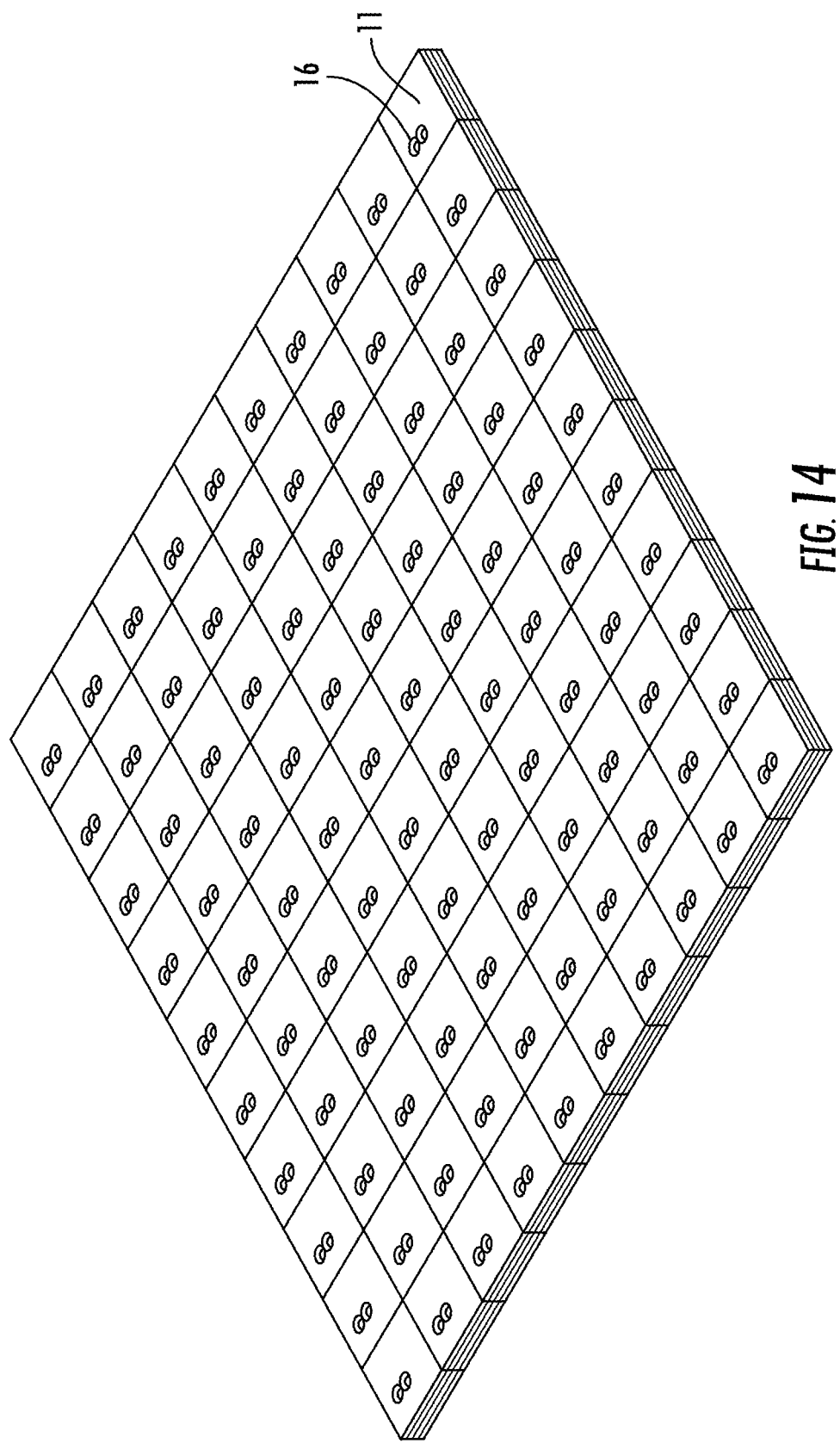
Figure 15:
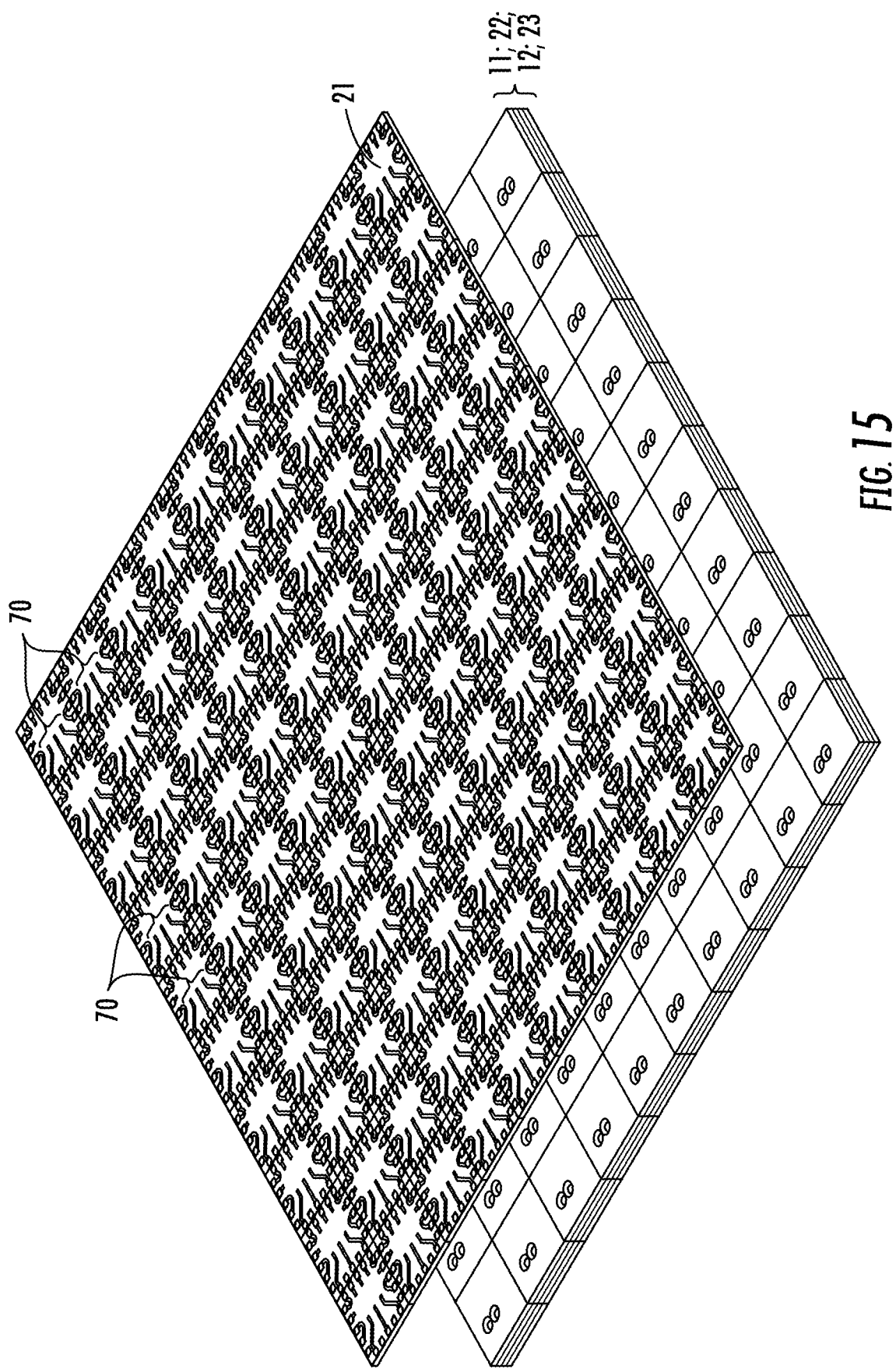

According to FIG. 12, the first layer is formed and patterned such that mechanical pattern elements, particularly the second engagement members 7 for mechanical engagement with the first engagement members 6 of coupling adapter pieces 40, are formed in the first layer, i.e. the future top layer 23. Nonetheless, this layer can be formed first or place as the bottommost layer when stacking the component layers of the layered substrate stack 150 onto one another. Later, the layered substrate stack will be singulated into a plurality of layered stacks which may then be mounted in reversed or flipped orientation, if required. In the course of the exemplary method described here, the uppermost layer 21 may be the last layer to be formed or, alternatively, to be bonded or laminated or otherwise connected to the other layers for completing the layered substrate stack 150 (FIG. 15). Nonetheless, the uppermost layer 21 may later be used as the support layer 19 or bottom layer 21 of the plurality of layered stacks and will then face the main surfaces of the circuit boards. On the other hand, the coupling adapter pieces 40 will later be mounted to the first, lowermost surface 23 of the layered substrate stack 150 which surface 23, upon dicing, will represent their top layer to which the coupling adapter pieces 40 are mounted as described above. Formation and/or patterning of the first layer in FIG. 11 may thus include the formation of engagement members, such as alignment bores, alignment openings, recesses, holes or other kinds of indentations in and/or through the first layer (future top layer 23) of the layered substrate stack.

Later, each singulated layered stack 10 will be mounted to a respective circuit board with its second layer 19; 21 facing the main surface of the respective circuit board.

Ahead of this, however, the layered substrate stack 150 is to be formed and completed. Formation of the layered substrate stack 150 not only includes finally forming and/or attaching the uppermost, second layer 19; 21 on top of the other stacked layers but, ahead of this, may include the formation of at least one intermediate layer 11; 22; 12 (FIGS. 13 and 14) on the first layer 23 before forming the second layer 19; 21 on the at least one intermediate layer 11; 22; 12. Also for manufacture and/or mounting of the at least one intermediate layer 11; 22; 12 substrate level or wafer level techniques are applicable.

The at least one intermediate layer 11; 22; 12 (FIGS. 13 and 14) may be pre-fabricated and then joined to either the first layer 23. In particular, an aggregate or stack of all three intermediate layers 11, 22 and 12 (FIG. 13) can be manufactured separately, for instance as a double-sided precision imprint layer which comprises lenses or lens surfaces for both the photo diodes and the VCSELs. The pre-fabricated three-layer stack comprising the layers 11, 22 and 12 may then be laid on the second layer 19; 21 and laminated, bonded or otherwise mounted to it. Also in the subsequent figures, by stacking or sandwiching these and further layers, a layered substrate stack 150 is provided which comprises the arrangement of layers as finally needed in each layered stack 10.

The layered substrate stack 150 has much wider lateral dimensions than the individual layered optical stack 10 finally mounted to the circuit board of the respective connector device 1. In the exemplary illustration of FIGS. 11 to 20, the layered substrate stack 150 may for instance comprise a footprint or surface area of 100 optical stacks 10 being arranged in a matrix of 10×10 optical stacks 10 per lateral direction of the substrate. In reality, however, much larger pluralities of layered optical stack 10 may combinedly formed out of a single predecessor substrate 150.

Formation of the at least one intermediate layer 11; 22; 12 comprises forming a plurality of micro-optical pattern elements, such as lenses or lens surfaces 16; 16' in at least one or some of the intermediate layers.

Figure 16:
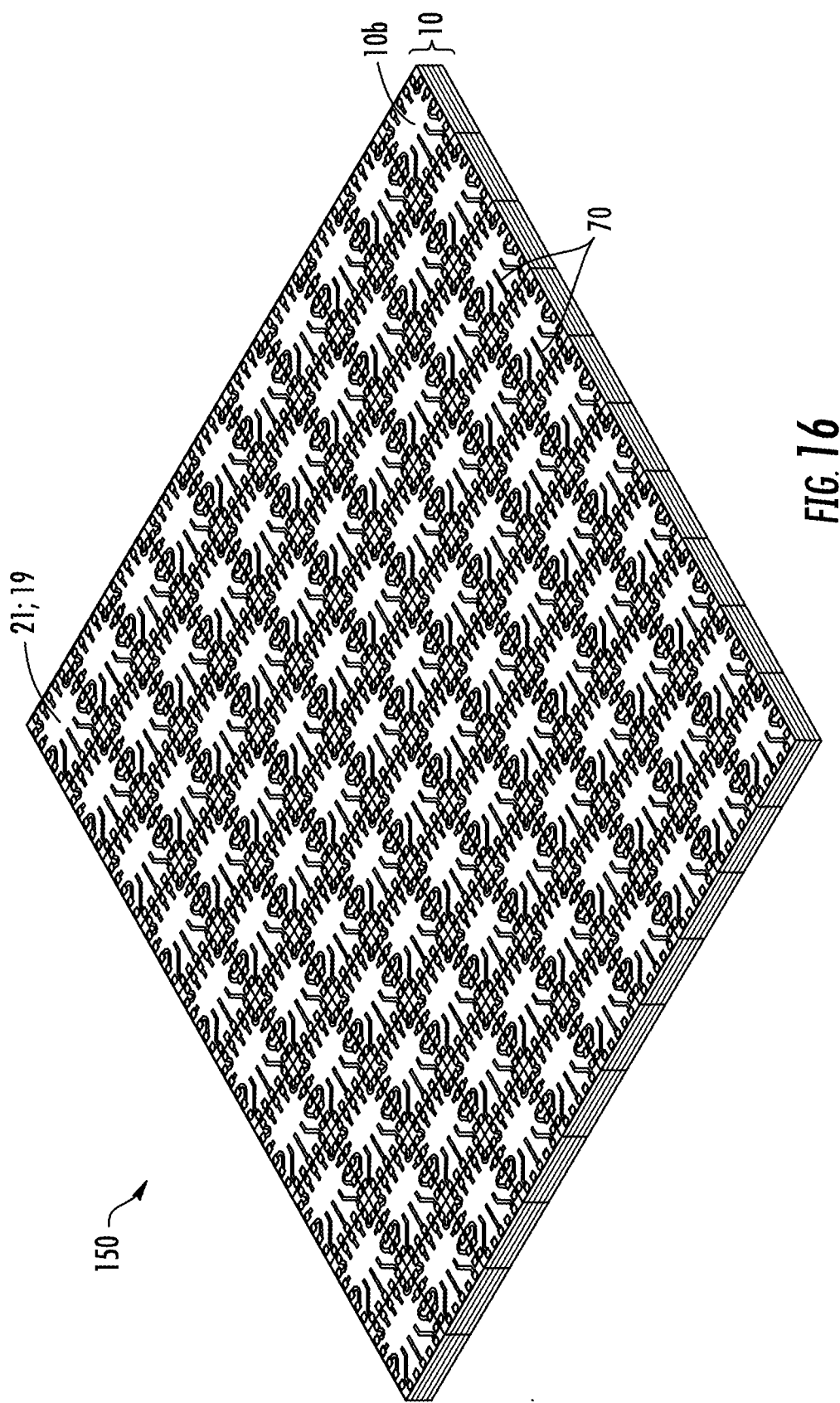
Figure 17:
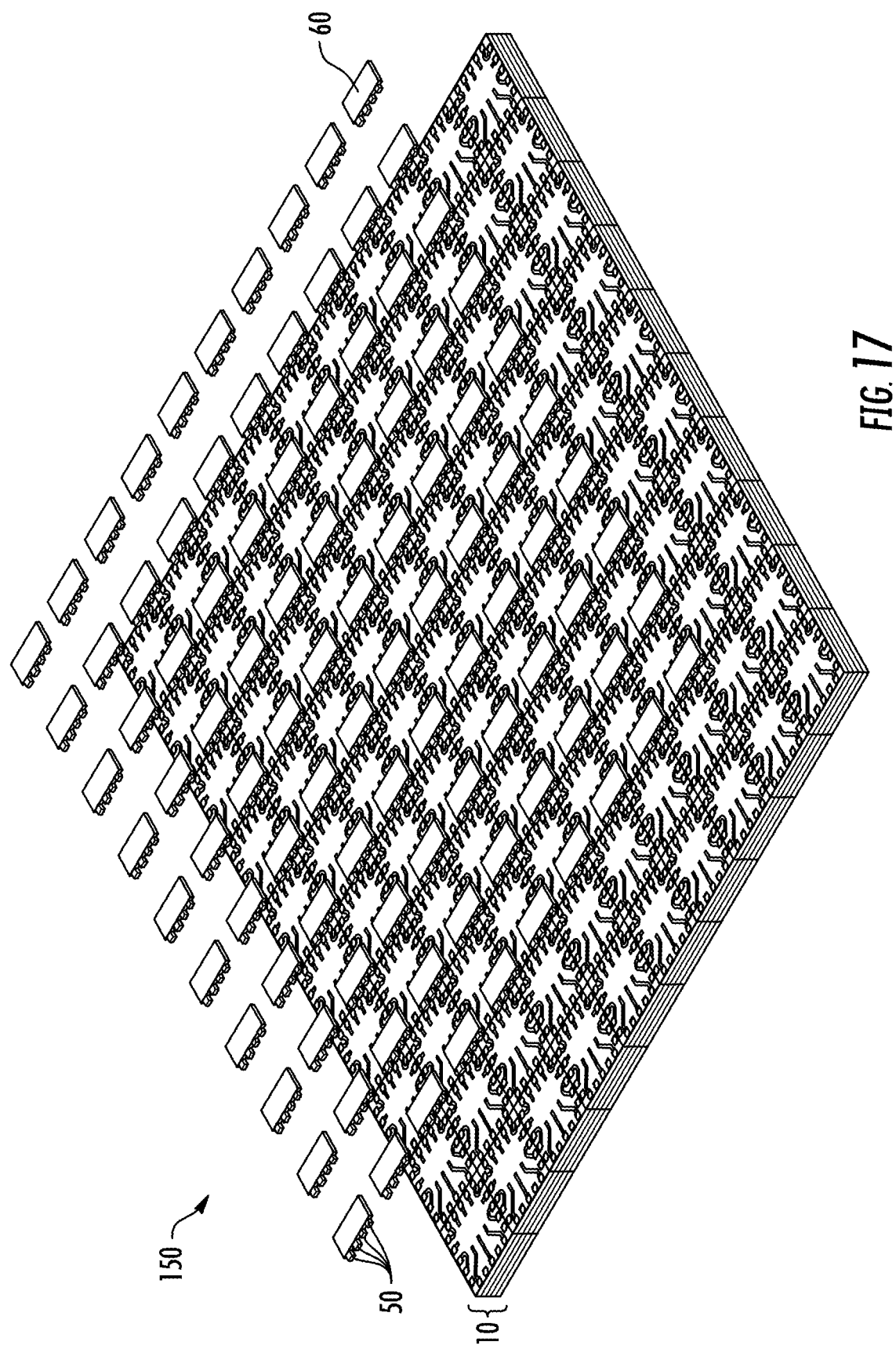
Figure 18:
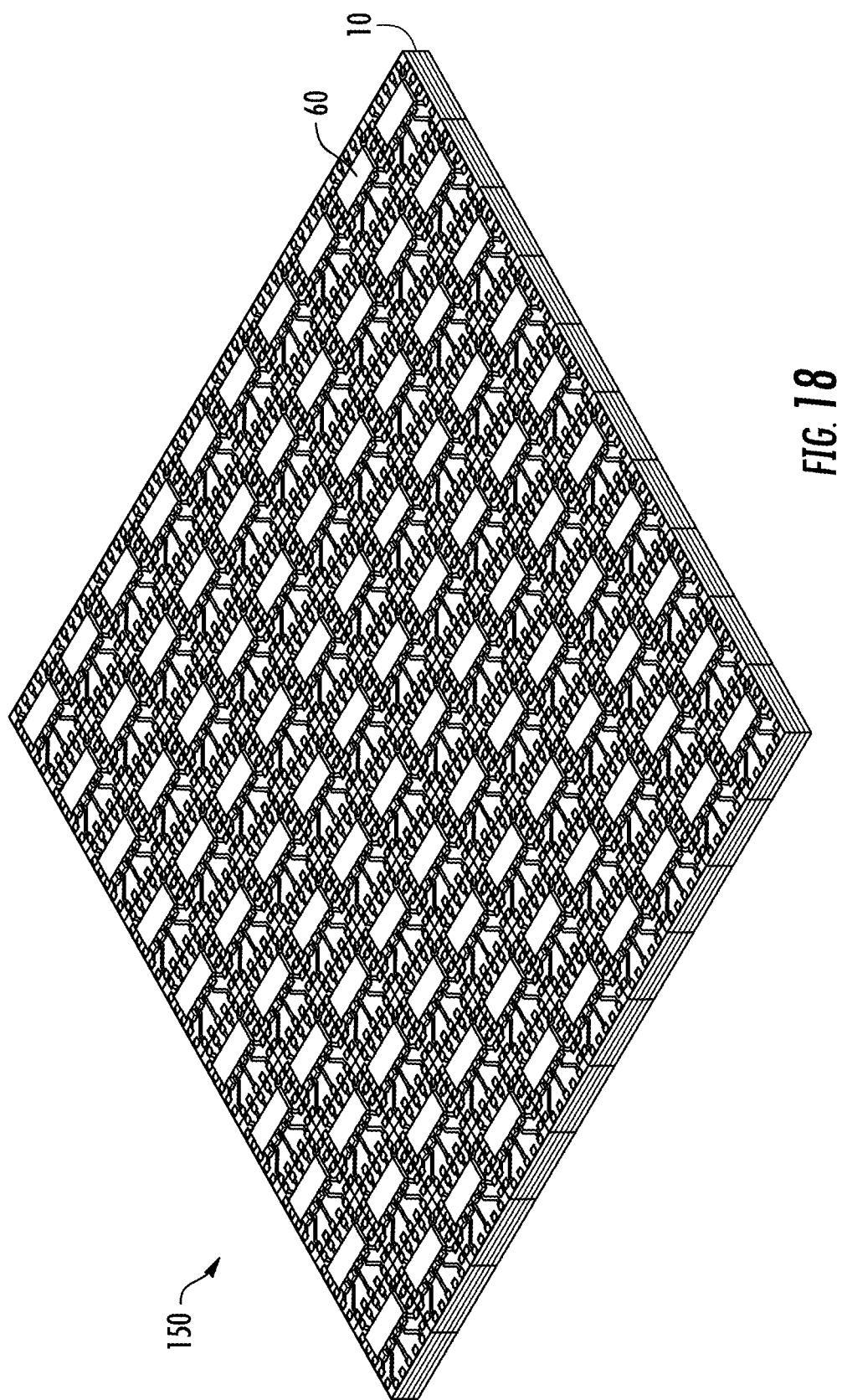
Figure 19:
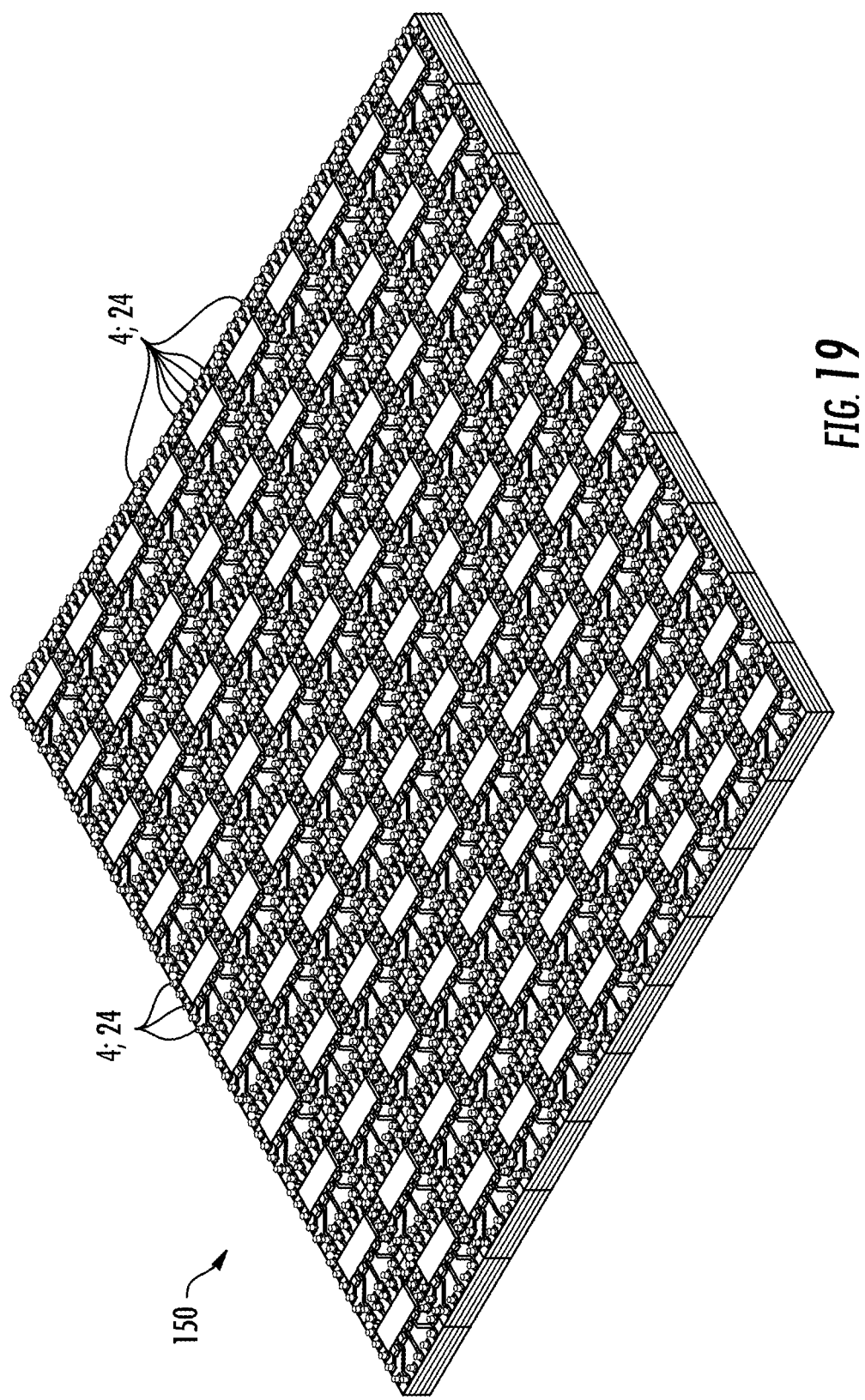

Formation of the layered substrate stack 150 also comprises or is followed by mounting, on a surface of the second layer 19; 21 of the layered substrate stack 150, a plurality of optoelectronic chips 60 (FIGS. 17 and 18). This may involve mounting, on the exposed surface of the second layer 19; 21 of the layered substrate stack 150, a plurality of sets of conductor lines 70 (FIGS. 15 and 16). The plurality of optoelectronic chips 60 are then mounted, ie. bonded or soldered to the plurality of sets of conductor lines 70 on the exposed surface 10b of the first layer 19; 21 of the layered substrate stack 150 (FIG. 18). Subsequently, plural arrays of electrical contacts 4; 24 may be formed on the plural of sets of conductor lines 70 (FIG. 19). After that, formation of the layered substrate stack 150 is complete.

A further benefit of the manufacturing method is that, at this stage of the manufacturing process (i.e. after mounting the sets of conductor lines 70 and/or the arrays of electrical contacts 4; 24), each connector device, optoelectronic chip 60 and/or optoelectronic element 50 can be tested in advance, that is even before the plural connector devices 10 are assembled, and even before the layered substrate stack 150 is going to be singulated and thus disintegrated.

After manufacture and, optionally, after testing, the completed layered substrate stack 150 is then sawn, diced or otherwise singulated (FIG. 20) into a plurality of layered stacks 10 such that each obtained layered stack 10 comprises one respective optoelectronic chip 60 mounted to a surface 10b of the first layer 19; 21, with one set of conductor lines 70 being provided between the respective optoelectronic chip 60 and the surface 10b of the first layer 19; 21 and with one array 24 of electrical contacts 4 being provided at the bottom surface 10b of each completed layered stack 10.

Accordingly, efficient stack and saw techniques are applicable for efficiently forming a plurality of connector devices 1. Furthermore, techniques for formation, handling and treatment of sheets of precision flat glass, for precision hole formation over a large surface area of such sheets, for placement of engagement members and/or of fiducial alignment marks, may be applied for manufacturing the plurality of layered optical stacks 10. Further techniques applicable for efficiently, simultaneous manufacturing the plural layered optical stacks 10 are layer imprint techniques, techniques of placing and/or electrically testing optoelectronic active elements, techniques of patterning conductor line traces, and techniques of solder ball deposition, for instance.

Figure 20:
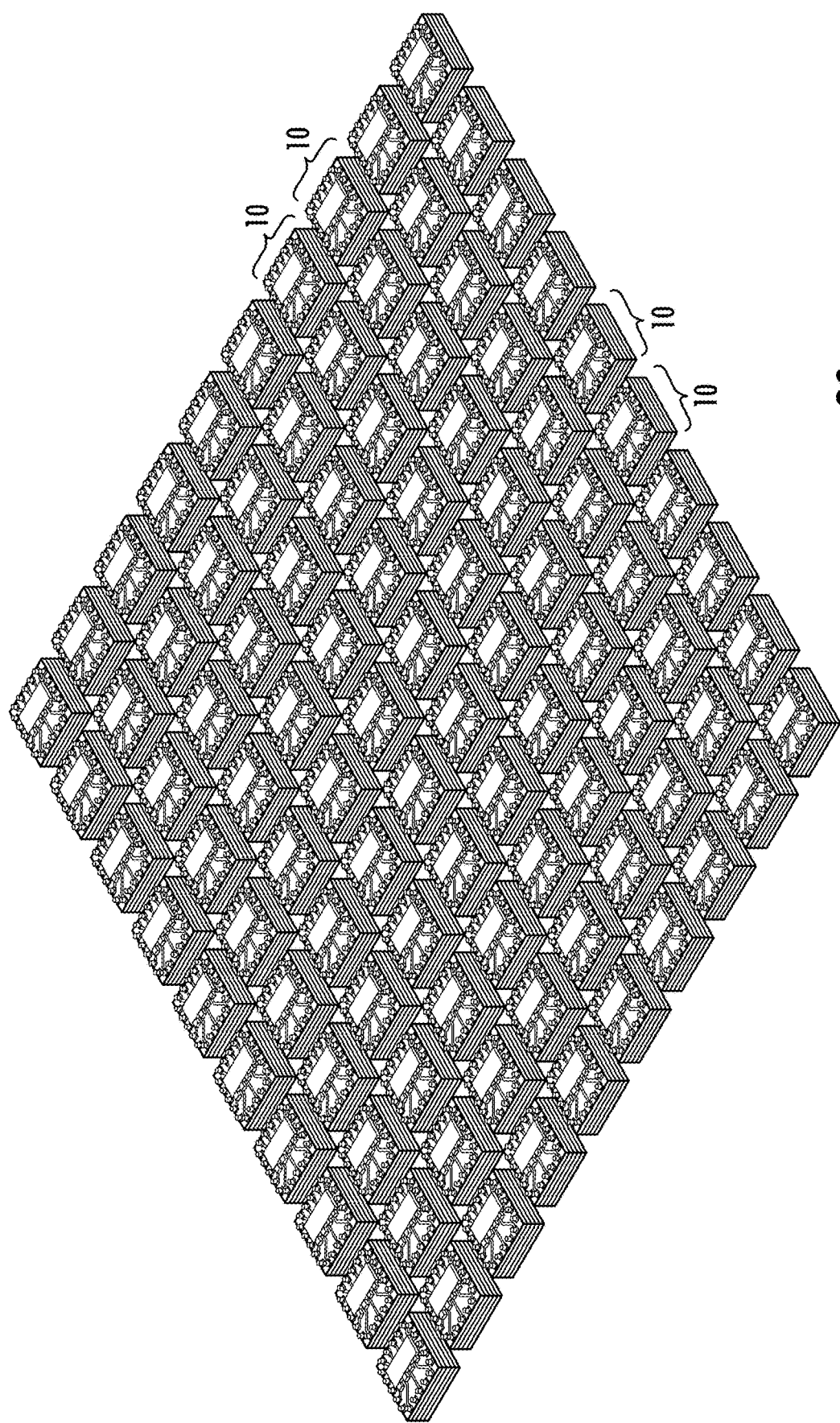

Thereafter, each of the diced layered stacks 10 shown in FIG. 20 is ready for mounting, with its array of electrical contacts 4; 24, to the main surface 2a of the respective circuit board 2. After that, manufacturing of the plurality of connector devices 1 of FIGS. 1 to 10 or of any other embodiment can be presumed.

The sequence of steps shown in FIGS. 12 to 20 thus involves a) patterning a surface of the first layer so as to form a plurality of optical and/or mechanical pattern elements in the surface of the first layer, b) sawing, dicing or otherwise singulating the multi-layer substrate, thereby obtaining a plurality of layered stacks each comprising the first layer, the second layer and at least one of the optical and/or mechanical pattern elements in the surface of the first layer; and c) assembling a plurality of connector devices. Step c) may particularly include mounting the layered stacks to circuit boards; mounting coupling adapter pieces to the first layer of the layered stacks (the coupling adapter pieces each comprising a reflection surface for reflecting electromagnetic radiation between a first propagation direction substantially normal to a main surface of the circuit board and a different, second propagation direction); and mounting fiber end piece holders, in an orientation for propagation of electromagnetic radiation along the second propagation direction, to the coupling adapter pieces.

In step c), the coupling adapter pieces 40 are mounted to the first layers comprising the second engagement members 7, either prior to or subsequent to mounting the layered stacks 10, via their respective array 24 of electrical contacts 4, to the main surface 2*a* of the respective circuit board 2. Subsequently or prior to this, the fiber end piece holder 25 may be mounted to the coupling adapter pieces 40.

Figure 21:
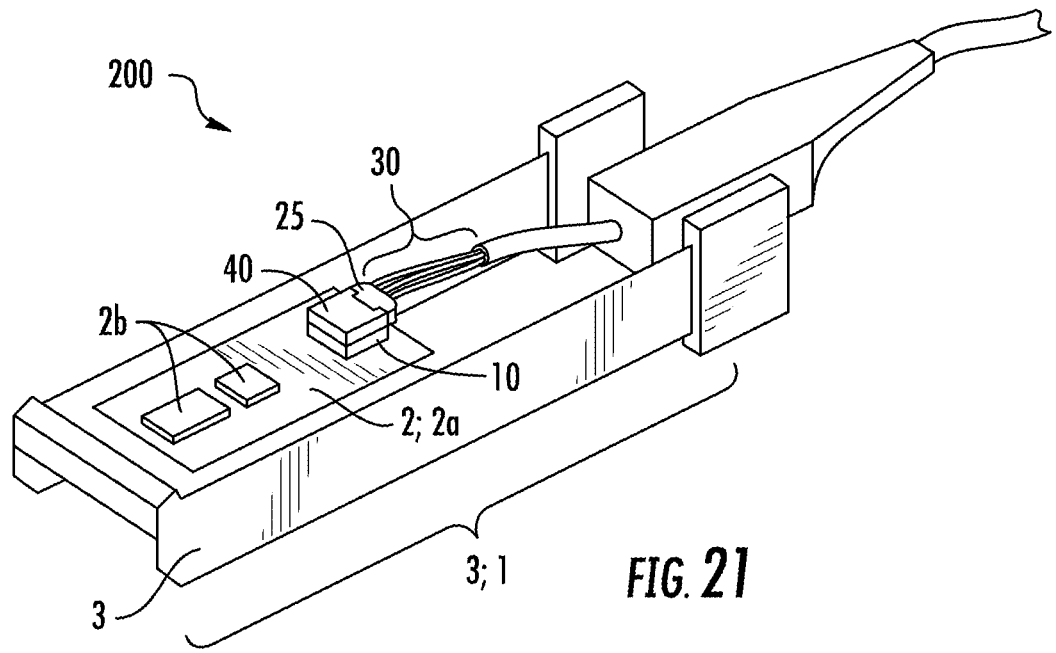
FIG. 21 shows a schematic view of a connector device couplable to an electric terminal.

FIG. 21 shows a schematic view of a connector device 1 couplable to an electric terminal 100, such as a USB port. The connector device 1 comprises one layered optical stack 10 mounted to a circuit board 2. The fiber end piece holder 25 is mounted to the coupling adapter pieces 40 which, in turn, is mounted to the top surface of the layer 23 of the layered optical stack 10. The circuit board is mounted at, on or in a connector plug 3, which may be a USB plug or any other kind of plug designed for plugging an active optical cable 200 to an electric terminal 100 (FIG. 22), for instance. Accordingly, at one or either end of an active optical cable 200, a connector device 1 can be provided for connecting a number of optical fibers 30 to the electric terminal 100. For instance, a cable comprising four or eight optical fibers 30 is provided with the connector device 1 at one or either end.

Figure 22:
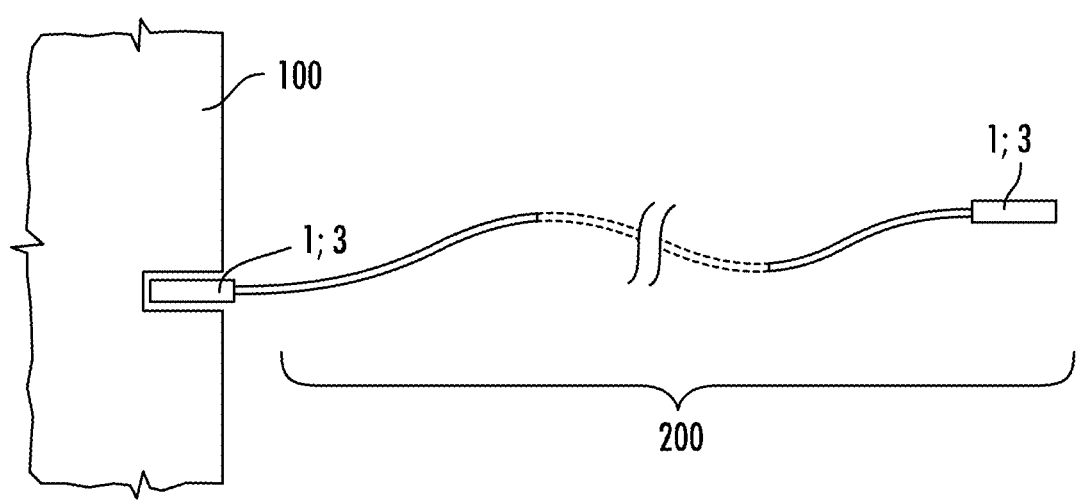
FIG. 22 shows two connector devices form a part of an active optical cable.

Finally, FIG. 22 shows two connector devices 1 of the present application which form a part of an active optical cable 200. The active optical cable 200 may, for instance, be a USB type-C cable which is pluggable an couplable to a USB-3 port.

What is claimed is:

1. A connector device for connecting at least one optical fiber endpiece, wherein the connector device at least comprises:
    a circuit board having a main surface;
    an optoelectronic chip, the optoelectronic chip comprising at least one optoelectronic active element capable of emitting and/or detecting electromagnetic radiation; the optoelectronic chip being oriented for emitting and/or detecting electromagnetic radiation propagating along a first propagation direction substantially normal to the main surface of the circuit board;
    a fiber end piece holder for holding at least one fiber end piece of at least on optical fiber; and
    at least one reflection surface for changing a propagation direction of electromagnetic radiation from the first propagation direction to a second propagation direction and/or from a second propagation direction to the first propagation direction, wherein the second propagation direction is different from the first propagation direction and/or from the normal direction of the main surface of the circuit board;
        wherein the connector device comprises a layered optical stack comprising a number of layers, the layered optical stack being designed for transmitting electromagnetic radiation along the first propagation direction;
        wherein the layered optical stack comprises a bottom surface comprising one or more conductor lines;
        wherein the optoelectronic chip is mounted to the bottom surface of the layered optical stack at the one or more conductor lines;
        wherein the connector device further comprises a coupling adapter piece mounted to the layered optical stack and/or to the circuit board, the coupling adapter piece being designed to hold and/or secure the fiber end piece holder in an orientation enabling propagation of electromagnetic radiation along the second propagation direction; and
        wherein the at least one reflection surface is comprised in the coupling adapter piece.

2. The connector device of claim 1, wherein the reflection surface is a surface portion of the coupling adapter piece, the surface portion being oriented and/or designed so as to change the propagation direction between the first propagation direction and the second propagation direction.

3. The connector device of claim 1, wherein the reflection surface of the coupling adapter piece is a reflection surface for total internal reflection, which reflection surface is oriented at an overall inclination angle of between 40° and 50° relative to the main surface of the circuit board.

4. The connector device of claim 1, wherein the reflection surface is a recessed surface portion of a top surface of the coupling adapter piece, the top surface facing away from layered optical stack and/or from the circuit board.

5. The connector device of claim 1, wherein the layered optical stack comprises a top surface and a bottom surface oriented parallel to one another and/or to the main surface of the circuit board.

6. The connector device of claim 1, wherein the coupling adapter piece comprises a bottom surface couplable to the top surface of the layered optical stack in an orientation parallel to the main surface of the circuit board.

7. The connector device of claim 1, wherein the bottom surface of the coupling adapter piece is an interface surface abutting a top surface of the layered optical stack.

8. The connector device of claim 1, wherein the fiber end piece holder comprises the coupling adapter piece and is mountable, via the coupling adapter piece, to the top surface of the layered optical stack.

9. The connector device of claim 1, wherein the fiber end piece holder comprising the coupling adapter piece is affixed to the top surface of the layered optical stack and/or to the circuit board.

10. The connector device of claim 1, wherein the coupling adapter piece is affixed to the top surface of the layered optical stack and/or to the circuit board, whereas the fiber end piece holder is detachably mounted or detachably mountable to the coupling adapter piece.

11. The connector device of claim 1, wherein the coupling adapter piece comprises an entrance/exit surface facing towards at least one fiber end piece surface, the entrance/exit surface being oriented transverse to the second propagation direction.

12. The connector device of claim 11, wherein the coupling adapter piece comprises at least one first engagement member designed to mechanically secure to the layered optical stack and/or to the circuit board in an aligned position and/or orientation.

13. The connector device of claim 12, wherein the at least one first engagement member of the coupling adapter piece is designed to mechanically engage with the top surface of the layered optical stack in an aligned position and/or orientation.

14. The connector device of claim 12, wherein the at least one first engagement member of the coupling adapter piece comprises a prong, a tooth, a pin or another kind of protruding member in the bottom surface of the coupling adapter piece.

15. The connector device of claim 12, wherein the layered optical stack comprises at least one second engagement member for mechanically engaging with the at least one first engagement member of the coupling adapter piece.

16. The connector device of claim 12, wherein the at least one second engagement member of the layered optical stack comprises a hole, a recess, an opening or another kind of indentation formed at least in an uppermost top layer of the layered optical stack.

17. The connector device of claim 12, wherein the at least one second engagement member comprises a hole, recess, an opening or another kind of indentation in the top layer of the layered optical stack.

18. The connector device of claim 12, wherein the fiber end piece holder comprises at least one third engagement member designed for mechanically coupling to the coupling adapter piece.

19. The connector device of claim 18, wherein the coupling adapter piece comprises at least one fourth engagement member for mechanically engaging with the at least one third engagement member of the fiber end piece holder.

20. The connector device of claim 1, wherein the coupling adapter piece is a monobloc body.

21. The connector device of claim 1, wherein the coupling adapter piece is made of a polymer.

22. The connector device of claim 1, wherein the reflection surface of the coupling adapter piece comprises optical surface regions associated with active elements.

23. The connector device of claim 1, wherein the reflection surface of the coupling adapter piece is inclined so as to enable light propagation, between the reflection surface and at least one fiber end surface of at least one optical fiber, along the second propagation direction orientated at an angle of between 70° and 90° relative to the normal direction of the main surface of the circuit board.

24. The connector device of claim 1, wherein the layered optical stack is provided at a distance from the main surface of the circuit board.

25. The connector device of claim 1, wherein the layered optical stack is mounted to the main surface of the circuit board by means of a plurality of electrical contacts.

26. The connector device of claim 25, wherein the optoelectronic chip is electrically connected to the circuit board via the plurality of electrical contacts supporting the layered optical stack.

27. The connector device of claim 25, wherein the plurality of electrical contacts form a ball grid array.

28. The connector device of claim 1, wherein the at least one optoelectronic active element faces a bottom side of the layered optical stack so as to enable signal transmission along the first propagation direction substantially normal to the bottom surface of the layered optical stack and/or substantially normal to the main surface of the circuit board.

29. The connector device of claim 1, wherein the layered optical stack at least comprises a top layer and a bottom layer.

30. The connector device of claim 29, wherein the top layer of the layered optical stack is a patterned layer which comprises at least one engagement member for engagement with at least one engagement member of the coupling adapter piece.

31. The connector device of claim 29, wherein the layered optical stack further comprises at least one intermediate patterned layer, the at least one intermediate patterned layer being arranged between the top layer and the bottom layer of the layered optical stack and being shaped to comprise at least one optical surface region associated with an active element.

32. The connector device of claim 31, wherein the at least one optical surface region comprises at least one optical lens surface.

33. The connector device of claim 31, wherein the at least one intermediate patterned layer comprises a first intermediate patterned layer and a second intermediate patterned layer, and each one of the first intermediate patterned layer and the second intermediate patterned layer comprises the at least one optical surface region.

34. The connector device of claim 1, wherein the top layer is a glass layer.

35. The connector device of claim 1, wherein the layered optical stack underneath the coupling adapter piece comprises four sidewalls at which all layers of the layered optical stack are flush with one another.

36. The connector device of claim 1, wherein the layered optical stack underneath the coupling adapter piece is an integral multi-layer substrate piece obtained by manufacture on a wafer level or substrate level basis.

37. A connector device for connecting at least one optical fiber endpiece, wherein the connector device at least comprises:
a circuit board having a main surface;
an optoelectronic chip, the optoelectronic chip comprising at least one optoelectronic active element capable of emitting and/or detecting electromagnetic radiation; the optoelectronic chip being oriented for emitting and/or detecting electromagnetic radiation propagating along a first propagation direction substantially normal to the main surface of the circuit board; and
at least one reflection surface for changing a propagation direction of electromagnetic radiation from the first propagation direction to a second propagation direction and/or from a second propagation direction to the first propagation direction, wherein the second propagation direction is different from the first propagation direction and/or from the normal direction of the main surface of the circuit board;
wherein the connector device comprises a layered optical stack comprising a plurality of layers, the layered optical stack being designed for transmitting electromagnetic radiation along the first propagation direction;
wherein the plurality of layers comprises at top layer comprising a second engagement member, a bottom layer, and at least one intermediate patterned layer, the at least one intermediate patterned layer being arranged between the top layer and the bottom layer of the layered optical stack and being shaped to comprise at least one optical lens surface associated with an active element;
wherein the layered optical stack is mounted to the main surface of the circuit board by a plurality of electrical contacts;
wherein the connector device further comprises a coupling adapter piece comprising a first engagement member, the coupling adapter piece mounted to a top surface of the layered optical stack by engagement between the first engagement member and the second engagement member, the coupling adapter piece being designed to hold and/or secure a fiber end piece holder and/or a plurality of fiber end pieces of optical fibers in an orientation enabling propagation of electromagnetic radiation along the second propagation direction; and wherein the at least one reflection surface is comprised in the coupling adapter piece.

38. An active optical fiber cable comprising a number of optical fibers and at least one connector device of claim 37.

39. An active optical fiber cable comprising a number of optical fibers and two connector devices of claim 37, wherein each optical fiber comprises two end pieces and wherein, at either side of the number of optical fibers, a respective one of the two connector devices is mounted to the end pieces of the number of optical fibers.

40. A connector device for connecting at least one optical fiber endpiece, wherein the connector device at least comprises:

an optoelectronic chip, the optoelectronic chip comprising at least one optoelectronic active element capable of emitting and/or detecting electromagnetic radiation; the optoelectronic chip being oriented for emitting and/or detecting electromagnetic radiation propagating along a first propagation direction;

a fiber end piece holder for holding at least one fiber end piece of at least on optical fiber; and at least one reflection surface for changing a propagation direction of electromagnetic radiation from the first propagation direction to a second propagation direction and/or from a second propagation direction to the first propagation direction, wherein the second propagation direction is different from the first propagation direction;

wherein the connector device comprises a layered optical stack comprising a top layer comprising at least one engagement member, a first intermediate layer, a second intermediate layer, and a bottom layer, the layered optical stack being designed for transmitting electromagnetic radiation along the first propagation direction;

wherein the first intermediate layer and the second intermediate layer are arranged between the top layer and the bottom layer of the optical stack, and at least one of the first intermediate layer and the second intermediate layer comprises a lens surface;

wherein the bottom layer of the layered optical stack comprises a bottom surface comprising one or more conductor lines, and the optoelectronic chip is mounted to the bottom surface of the layered optical stack at the one or more conductor lines;

wherein the connector device further comprises a coupling adapter piece mounted to the layered optical stack, the coupling adapter piece being designed to hold and/or secure the fiber end piece holder in an orientation enabling propagation of electromagnetic radiation along the second propagation direction; and wherein the at least one reflection surface is comprised in the coupling adapter piece.

\* \* \* \* \*

UNITED STATES PATENT AND TRADEMARK OFFICE
CERTIFICATE OF CORRECTION

PATENT NO. : 10,698,167 B2
APPLICATION NO. : 15/705638
DATED : June 30, 2020
INVENTOR(S) : Jeffery Alan DeMeritt et al.

Page 1 of 1

It is certified that error appears in the above-identified patent and that said Letters Patent is hereby corrected as shown below:

On the Title Page

In Column 1, item (73), Assignee, Line 1, delete "Communcations" and insert -- Communications --, therefor.

Signed and Sealed this
Eighth Day of December, 2020

Andrei Iancu
*Director of the United States Patent and Trademark Office*